(12) United States Patent
Orchard et al.

(10) Patent No.: US 9,330,344 B2
(45) Date of Patent: May 3, 2016

(54) PHOTONIC PROCESSOR WITH PATTERN MATCHING AND IMAGE RECOGNITION

(75) Inventors: David Arthur Orchard, Malvern (GB); Rebecca Anne Wilson, Malvern (GB); Jonathan Alexander Skoyles Pritchard, Malvern (GB); Martin James Cooper, Malvern (GB); Terence John Shepherd, Malvern (GB); Andrew Charles Lewin, Malvern (GB); Paul Richard Tapster, Malvern (GB); Charlotte Rachel Helen Bennett, Malvern (GB)

(73) Assignee: QINETIQ LIMITED (GB)

( * ) Notice: Subject to any disclaimer, the term of this patent is extended or adjusted under 35 U.S.C. 154(b) by 971 days.

(21) Appl. No.: 13/498,458

(22) PCT Filed: Sep. 28, 2010

(86) PCT No.: PCT/GB2010/001810
§ 371 (c)(1),
(2), (4) Date: Sep. 21, 2012

(87) PCT Pub. No.: WO2011/036465
PCT Pub. Date: Mar. 31, 2011

(65) Prior Publication Data
US 2013/0019084 A1 Jan. 17, 2013

(30) Foreign Application Priority Data

Sep. 28, 2009 (GB) .................................. 0916983.0
Sep. 29, 2009 (GB) .................................. 0917084.6
Aug. 5, 2010 (GB) .................................. 1013195.1

(51) Int. Cl.
*G06F 9/00* (2006.01)
*G05B 15/00* (2006.01)
(Continued)

(52) U.S. Cl.
CPC .. *G06K 9/74* (2013.01); *G06F 7/02* (2013.01); *G06F 2207/025* (2013.01)

(58) Field of Classification Search
CPC ....................... G05B 2219/23026; H04J 14/00
See application file for complete search history.

(56) References Cited

U.S. PATENT DOCUMENTS 7,454,418 B1  11/2008  Wang
7,683,812 B2  3/2010  Lewin
(Continued)

FOREIGN PATENT DOCUMENTS

WO    WO 2006/043057    4/2006

OTHER PUBLICATIONS

McGeehan et al., "Optical Header Recognition Using Fiber Bragg Grating Correlators", 2002, IEEE.*
(Continued)

*Primary Examiner* — Hyun Nam
(74) *Attorney, Agent, or Firm* — McDonnell Boehnen Hulbert & Berghoff LLP

(57) ABSTRACT

Apparatus (100) is provided which is arranged to accept an input data stream. In some embodiments, the apparatus (100) comprises a sampler arranged to sample the input data stream to provide k samples thereof, wherein each of the samples is n bits long and a string selector arranged to select m binary strings n bits long from at least a chosen subset of all random binary strings of a predetermined length. The apparatus (100) may further comprise a logical operator arranged to perform a logical function for each of the k samples with each of the selected binary strings to provide a vector, a memory arranged to store a matrix of the vectors generated from k samples, and an address generator arranged to generate RAM address segments from the matrix. In embodiments, the apparatus (100) may comprise a processor for, for example, pattern matching; feature detection, image recognition.

26 Claims, 18 Drawing Sheets

(51) Int. Cl.
*G06K 9/74* (2006.01)
*G06F 7/02* (2006.01)

(56) References Cited

U.S. PATENT DOCUMENTS

| | | |
|---|---|---|
| 2002/0145776 A1* | 10/2002 | Chow et al. ............ 359/124 |
| 2004/0059721 A1 | 3/2004 | Patzer |
| 2005/0086520 A1 | 4/2005 | Dharmapurikar et al. |
| 2006/0274189 A1* | 12/2006 | Mouli ............ 348/340 |
| 2007/0260602 A1 | 11/2007 | Taylor et al. |
| 2008/0065639 A1 | 3/2008 | Choudhary et al. |
| 2009/0031175 A1 | 1/2009 | Aggarwal et al. |
| 2009/0138534 A1* | 5/2009 | Lee et al. ............ 708/209 |
| 2009/0157721 A1 | 6/2009 | Tal |
| 2009/0224801 A1 | 9/2009 | Lewin |
| 2010/0040380 A1 | 2/2010 | Lewin et al. |

OTHER PUBLICATIONS

Aljada et al., "Opto-VLSI-Based Correlator Architecture for Multiwave Optical Header Recognition", Journal of Lightwave Technology, vol. 24, No. 7, Jul. 2006, pp. 2779-2785.

Takahashi et al.,"40-Gbit/s Label Recognition and 1x4 Self-Routing Using Self-Serial to Parallel Conversion", IEEE Photonics Technology Letters, IEEE Service Center, vol. 16, No. 2, Feb. 1, 2004, pp. 692-694.

* cited by examiner

85 LUTs per 2 x 128 bit EXOR tree x 16 byte positions x 32 category bits ≈43,520 LUTs

PHOTONIC PROCESSOR WITH PATTERN MATCHING AND IMAGE RECOGNITION

FIELD OF THE INVENTION

The present invention relates to processing apparatus and to related methods, signals, and programs for a computer.

BACKGROUND OF THE INVENTION

This invention relates in some aspects to improvements to an apparatus for processing of data. The processing apparatus (or processor) may be 'photonic' in the sense that it uses optical, rather than electrical, signals in at least part of its processing. Such processors could be used, for example, for high speed, real time pattern matching; or may be adapted for a number of purposes such as feature detection, image recognition, and to perform a large number of mathematical or logic functions, approximations thereof and the like.

Optical processors which can for example be used in pattern recognition are known. For example, our WO2006/043057 describes a correlator apparatus that uses fast phase modulation and parallel optical processing to allow high speed correlation. Our WO2008/075021 describes another such system which uses amplitude modulation and intensity summing. Such processes can also be implemented in purely electronic systems. Examples of such systems are shown in our applications WO2007/068909 and WO2007/138258. All four of these documents are incorporated herein by reference.

Pattern recognition is concerned (in its broadest sense) with the process of recognising one or more known objects or sequences in incoming data, for example text imagery or DNA chains, by comparing known reference object(s) with the data:

There are many areas in which pattern recognition is used, from interrogating databases to locate specific search terms to biometric based recognition systems and target identification in two-dimensional imagery. Often the search is performed digitally using a suitably programmed processor to compare a known reference data string with the data to be searched to identify a match. One example is an internet search engine which compares one or more input reference words with internet data to identify a match.

When searching very large amounts of data, some pattern identification techniques may be slow or require very large amounts of processing power. Also when data is received at high data rates, for example at telecommunications data transfer rates, software based systems may be unable to perform pattern matching at this speed. In some cases, even special purpose electronic hardware may be impracticable or very difficult to implement due to considerations such as power consumption.

SUMMARY OF THE INVENTION

In one aspect, the present invention concerns a processor arranged to map data to locations in a memory.

In one embodiment, the processor is arranged to perform pattern matching. The patterns to be matched ('dictionary entries') are mapped to addresses within a memory such that it is sparsely populated with entries. An input data stream, in which patterns are to be detected, is processed to produce a consistent mapping to an address or addresses in the memory space. The address in the memory (e.g. RAM) is then checked to see if a dictionary entry is indicated by that location. Further processing may be carried out to determine the dictionary entry or to derive further information concerning the nature of the input data stream.

The processor may search for a number of pre-defined patterns simultaneously. When a pattern in the search list (known as the "dictionary") is found, the processor may output a trigger pulse designed to indicate the position of the pattern in the input bit stream. An output indicating which pattern has been found may also be made available. This allows the processor to be utilised as a correlator.

In preferred embodiments, there is no fundamental limit to the number of entries in the dictionary, or to their size, or to their distribution in the input bit stream. However, in practical systems, the number of entries may be limited by available memory (or the cost of memory).

There may be one or more memories (or partitions of memory), each of which may relate to the same dictionary or to different dictionaries.

The architecture of the processor may be flexible and may be made adaptable. In a preferred embodiment, the processor comprises a high speed optical 'front end' with 'back end' electronics used to produce the output. In such embodiments, the processor is preferably arranged such that the back-end electronics is able to identify the dictionary entry found by searching only a small subset of the dictionary to find out which particular match was found. As will be appreciated by the skilled person, electronic processing apparatus are generally slower, but more cost effective, than photonic equivalents and are therefore often preferred for less demanding tasks.

In one embodiment, the processor comprises a memory arranged to detect or indicate occurrence of any entry in a dictionary of $2^{20}$ (i.e. 1,048,576) binary strings (1s or 0s) each of length 512 bits, at an input data-stream running at a rate of 40 gigabits per second (Gbit·s$^{-1}$) scalable to 100 Gbit·s$^{-1}$ and beyond. In some embodiments, tests will be performed on byte boundaries (i.e. every 8 bits). However adaptation of the architecture in other embodiments could implement tests every N bits where N is any integer≥1.

In one embodiment, the processor comprises a photonic processor designed to operate at the maximum speed that can be delivered by a commercial optical communications link, and preferably the processor is arranged such that it can scale in line with advancing technology.

The use of photonics allows the processor to be compact and the processor may consume little power compared to conventional electronic systems. For example, in the example embodiment described below, careful design by a skilled person may result in a system consuming only a few hundred watts (for an example of 100 GB·s−1 (100 Gigabits per second) operating rate, a 512 bit word and a dictionary of $2^{20}$ (1,048,576) entries) depending on design and choice of engineering trade-off parameters, and the volume occupied by the equipment to a ≤½ height (12-15 HU) standard nineteen inch rack. That compares with a solely electronic system that typically uses at least several kilowatts and occupies several if not many nineteen inch racks, and which may require specialised cooling equipment.

In one embodiment, this invention comprises a correlator of the one dimensional type, i.e. it does not use Fourier transforms; however it is not limited to any particular dimensionality that may be implied by signal structure.

The processor may not actually perform correlation functions; rather it may detect membership of random sets that contain the patterns sought, preferably in such a way that false alarms (i.e. the indication that a pattern is present when in fact it is not) are highly unlikely.

In a preferred embodiment, the processor is arranged to search for any binary string of a given length in a pre-defined dictionary, in parallel, optionally at the full rate of the system. The binary string may include wildcards to search for approximately similar dictionary terms. It is possible to vary the engineering parameters such that a variety of lengths of pattern could be sought.

The full rate of the system may be 10 Gigabits per second, 40 Gigabits per second or, as and when suitable telecoms components become available, 100 Gigabits per second or more.

Preferably, the length of the binary string representing the search pattern is not fundamentally limited and the system is scalable in terms of complexity with the length of the string (this relationship may or may not be linear, and may depend on the required function of the processor). Typical values for desirable string length are 64 bits, 128 bits, 256 bits, 512 bits, 1024 bits or higher values of $2^N$ where N is a positive integer.

Preferably, the dictionary size (i.e. number of entries, meaning number of patterns to be recognised) is not fundamentally limited. In some practical embodiments, the available dictionary size is defined by a number of engineering trade-off parameters in the system. A typical dictionary size may be 10,000, 100,000 or 1,000,000 entries (for example binary strings). However, dictionary sizes of up to 1,000,000,000,000 or more binary strings are also envisaged (such embodiments may comprises multiple, for example several thousand memory cards (e.g. 64 Gigabyte flash cards)).

The processor may be arranged such that the dictionary may be altered "on the fly". In one embodiment, a full refresh for a size of 1,000,000 dictionary terms (i.e. the time taken to assign memory locations to all dictionary entries and then write a "1" into every relevant location) may be possible in of the order of a second. By precalculating the memory configuration and loading into a second bank of memory, more rapid switch-over could also be achieved In one embodiment, the processor is arranged to "learn" its dictionary, and in other embodiments, the contents of the dictionary could be addressed (i.e. representative locations written) directly into memory, for example using electronic processing of the dictionary terms which is equivalent to the photonic processing employed (which could be utilised for the input data stream).

In one aspect, the invention can be seen as comprising a mapping apparatus and associated methods.

In such embodiments, the mapping apparatus may utilise hashing functions to map the data. For example, if a dictionary term (or input data sample) length is 'a' bits long (where a is an integer), then the number of possible terms of that length is given by $2^a$. (For 'a' greater than ~40 the number begins to become very large e.g. if a=40, there are $2^{40}$ possible sequences. To list all possible such strings would require several terabytes of memory). For the purposes of example, if a dictionary is to contain terms of 512 bits long (as may be the case—shorter terms could be searched for in other embodiments or by using wild cards), the number of possible terms is $2^{512}$. As will be apparent to the skilled person, this is a very large space and unlikely to be available or desirable as RAM in a practical system, for example due to the associated cost.

In one embodiment, the invention comprises using one or more hashing function(s) to reduce the length of the terms (and input stream samples) such that it may be used as an address to a memory of practical size, for example, $2^b$. In one example, if a=512, b might for example be 32. This allows more dictionary terms than could sensibly be indexed individually using a computer memory to be monitored.

In a preferred embodiment, therefore, wherever an input of length a appears on the input stream, the apparatus generates an address of length b and accesses a memory of size $2^b \times 1$ bit.

In other embodiments, the address lines may be used in separate or mixed groups to address a number of separate random access memories, the outputs of which themselves form a pattern to be assessed by downstream processing.

In order to achieve this, one or more hashing function(s) may be used to reduce all input strings of length a to a string of length b. In one embodiment, these hashed strings are used as b address lines to a one bit memory of capacity $2^b$ bits.

The mapping from each one of the possible $2^a$ input words to the set of $2^b$ address words is preferably random but consistent. This may be advantageous in that such a system could readily be arranged such that it remains uncommitted to, and uncorrelated with (to an overwhelming probability), the words in any chosen dictionary or any of the given input signals.

If the number of terms in the dictionary is c, the ratio of b:c defines (statistically) the likely false alarm rate and therefore, in preferred embodiments, b is significantly greater than c.

Although is not essential, a, b or c may be powers of two. This is for convenience to fit in with conventional notions of computer science and, where appropriate, readily available components and subsystems.

In a preferred embodiment, addresses generated by terms in the dictionary (i.e. where a dictionary term is seen in an input data stream) are arranged to produce a "1" from the memory whereas words not in the dictionary will produce an output at random. However, since $2^b \gg 2^c$ then a word not in the dictionary will produce a "0" with high probability and a "1", which may be seen as a false alarm, only occasionally. However, system design choices can be made such that false alarms are rare and these may be "removed" by back-end electronics which therefore provide false alarm removal.

In such a system, there are no missed detections.

The false alarm removal may be achieved, for example by use of a look-up table or other known techniques. As the processor may be arranged such that the rate at which false alarms are received is very much less than the rate at which data is input to the processor, the requirements on false alarm removal apparatus need not be excessive. The data rate at the false alarm reduction stage may be for example 3 or 4 orders of magnitude slower than the input data rate. In an example embodiment, with a significantly larger number of memory locations (in this example the memory is $2^{32}$ bits) than the number of patterns of interest (in this example $2^{20}$), the data rate may be reduced by a factor of 4096. This is because only 1 in 4096 memory locations contains a 1, i.e. a 1 is only detected once in every 4096 patterns received. This reduces the false alarm reduction work rate with respect to the data input rate by the same factor, enabling pattern matching with large dictionaries at high data input rates.

In one aspect of the invention, a 'signal space' containing all possible dictionary entries is mapped into a manageable space (a sub-space), using a random but consistent mapping, where each element may be represented by a single memory location. The size of the memory used to contain the "manageable" space should be larger (and preferably very much larger) than the actual number of dictionary entries. This is to limit the possibility of clashes in data storage. However, as a larger space is being mapped to a smaller space, the possibility of clashes cannot be eliminated.

According to some of the apparatus and methods described herein, it may be impossible, or highly (or even overwhelmingly) unlikely, to discover the dictionary by observing the contents of the memory within the system, or its state, or any of the inputs.

This may have associated advantages in that it is possible to load the required knowledge of the dictionary using an open communications channel from a remote location without the dictionary being known by any party except the source. In this instance, for the dictionary term to be identified, a single bit message needs to be returned to the source, or for the word to be narrowed down to a small subset of the dictionary, a short (dependent on dictionary size) binary sequence needs to be sent. Even with such communications, it may not be possible to infer the dictionary directly from the apparatus or the communications channel.

In one aspect, the invention comprises an entropy conditioning unit arranged to increase the entropy of an input signal. In a preferred embodiment, it maximises the entropy of an input signal.

The entropy conditioning unit may be used in conjunction with the processors and apparatus described in relation to other aspects of the invention. This may be beneficial in some embodiments where the input signal entropy is low, in which case the subspace will not be fully utilised and the discriminatory power of the machine would suffer as a result. The entropy conditioning unit is used to randomise, consistently, the input signal such that input strings with small differences would become dissimilar.

In one aspect, the invention comprises apparatus and associated methods for detecting membership of random sets that contain patterns sought.

The invention may comprise apparatus and methods to ensure an approximately even distribution of input data within the available memory, i.e. all locations having an approximately equal probability of being addressed given a random choice of input samples. In some examples, the approximately even distribution is achieved by use of entropy conditioning.

The invention is also directed to methods by which the described apparatus operates and including method steps for carrying out every function of the apparatus.

In one aspect, the invention comprises a method of processing an input data stream, the method comprising the steps of:
 (i) taking k samples of the input, wherein each sample is n bits long;
 (ii) for each of the k samples, selecting m binary strings from at least a sub set of all random binary strings of a predetermined length wherein each of the selected m binary strings is different;
 (iii) for each of the k samples, performing a logical function with each of the m binary strings to generate a new binary string, resulting in a set of m new binary strings;
 (iii) forming a vector from each of the new m binary strings
 (iv) forming a matrix out of the set of vectors; and
 (v) generating segments of RAM addresses from the matrix.

k, m and n are integers.

In a preferred embodiment, the method may further comprise ensuring that all bits of the input data stream are represented. This has the advantage that all of the input stream can be analysed.

In one example, the k samples are taken consecutively from the data stream. This may be advantageous as it allows information to be extracted from every possible string in every possible position in the data stream. However, this need not be the case in all embodiments. In some embodiments, for example, the input data stream may be tested on byte boundaries and therefore a sample is taken every 8 bits. Samples could be taken more or less often than once every 8 bits.

In one embodiment, the method may further comprise conditioning the input stream to ensure that the generated addresses are substantially evenly distributed throughout the available address space provided by the RAM. This is advantageous as it reduces the incidence of data clashes (i.e. two samples of data being mapped to the same location). In such embodiments, the conditioning may comprise entropy conditioning.

In such embodiments, the method may comprise assessing the entropy of the input data stream and, if the entropy is below a predetermined threshold, processing the input to increase the entropy. This may assist in efficient of running of the system. For example, if the input data stream has only a few "1"s in it then the RAM would not be used efficiently and the discriminatory powers of the device would be reduced. By increasing the Hamming distance between the representations of similar inputs in the RAM, such problems could be overcome. As will be familiar to the skilled person, Hamming distance is defined as the number of binary bits by which two strings of the same length differ.

The step of conditioning the entropy may comprise processing the input data with a random number. In one embodiment, the random number may be looped such that each sample, or set of samples, is processed by the same random number.

In one embodiment, the selected binary strings may be selected from a subset of the possible binary strings of length n, wherein the subset is defined by the number of ones in the string. In one embodiment, the number of ones is (n/2)−1.

In one embodiment, the selected binary strings may be selected from a subset of strings which have been identified following analysis of the input data. This allows the strings to be tailored to the characteristics of the data received.

In one embodiment, the selected binary strings may be tested, for example by processing the output new binary string to determine if the selected binary strings produce unrelated new binary strings. The method may further comprise selecting further binary string(s) if the selected new binary strings do not meet predetermined criteria.

The step of forming a vector from the m binary strings may comprise summing the ones contained in each m binary string produced by the logical function. In such embodiments, the method may further comprise using a threshold detector. In optical systems, the threshold detector may comprise one or more photo detectors, for example one or more photodiodes. Preferably, the method is arranged such that the threshold is exceeded by approximately 0.5 of the input strings. In other examples, other methods may be used to form the vector, for example, an XOR function or the like (which may be a XOR or an XNOR tree).

The step of forming a vector from the m binary strings may comprise carrying out at least one hashing function. This is advantageous as it may reduce the length of the binary string and hence the size of the memory required.

The method may further comprise checking the generated RAM address segments to determine if they relate to a RAM entry indicative of a pattern. This allows the method to be used for pattern matching/correlation functions. In one embodiment, the arrangement of ones in the RAM (or RAMs) defines the set of patterns to be matched.

In one embodiment, the method comprises initialising RAM (or RAMs) by setting all of the contents to zero.

In one embodiment, the RAM contents may then be defined by inputting patterns of interest ("dictionary terms"), processing the patterns according to the methods set out for processing an input data stream set out above to generate a RAM address and setting the corresponding locations to a "1".

In another embodiment, with knowledge of the m random numbers compared to the n bit long samples in order to form the matrix from which the address segments are formed, and with knowledge of the architecture of the processor, appropriate "1"s are written into the RAM(s) directly. The "1s" in the RAM(s) therefore represent the sets containing the patterns sought.

In some embodiments, the method may comprise allowing two or more users of the machine to separately seek patterns without interference between, or knowledge of, each other's activities.

In one embodiment, the logical function performed is a bitwise AND function. A bitwise AND function is defined as a "1" being present in a location of an output string if (and only if) both of the corresponding locations in the two input strings contain a one. In other embodiments, XOR functions may be utilised.

According to one aspect, the invention comprises processing apparatus arranged to accept an input data stream, the apparatus comprising
  (i) a sampler arranged to sample the input data stream to provide k samples thereof, wherein each of the samples is n bits long,
  (ii) a string selector arranged to select m binary strings n bits long from at least a chosen subset of all random binary strings of a predetermined length,
  (iii) a logical operator arranged to perform a logical function for each of the k samples with each of the selected binary strings to provide a vector
  (iv) memory arranged to store a matrix of the vectors generated from k samples
  (v) an address generator, arranged to generate RAM address segments from the matrix.

In one embodiment, the apparatus may further comprise more than one RAM (or a bank of at least two RAM portions).

In one embodiment, the apparatus comprises at least one photonic component.

In one embodiment, the sampler is arranged to take a sample of the data starting with consecutive bits. This allows all possible input data strings of length n to be sampled. In other embodiments, the sampler may be arranged to sample the data every 8 bits. This allows byte boundary data to be sampled. Other sampling timings may be used.

In one embodiment, the apparatus comprises a serial to parallel converter arranged to convert the input sample to a parallel signal. This is advantageous in that it may facilitate processing of the sample.

The logical operator may comprise a bitwise AND operator. This may be provided, for example, by an array of micro mirrors (on which the m binary strings are represented), or an AND gate, or the like.

The string selector may be arranged to be optimised following an analysis of at least one of the input data and the result of the data output by the logical operator.

The apparatus may comprise one or more threshold detectors. For example, in photonic systems, one or more photo-detector such as one or more photo-diodes may be provided.

The matrix may be an m×k matrix and the address generator may be arranged to generate RAM address segments by reading across a row of the m×k matrix. This allows correlations between the k different n bit samples to be taken into account.

The invention also provides for computer software in a machine-readable form and arranged, in operation, to carry out every function of the apparatus and/or methods.

The invention is also directed to signals employed by the other aspects of the invention.

In one aspect, the invention may comprise a data structure, wherein the data is indicative of a dictionary. The data structure may be a result of the methods described herein.

The preferred features may be combined as appropriate, as would be apparent to a skilled person, and may be combined with any of the aspects of the invention.

DESCRIPTION OF THE DRAWINGS

In order to show how the invention may be carried into effect, embodiments of the invention are now described below by way of example only and with reference to the accompanying figures in which.

DESCRIPTION OF THE INVENTION

In the embodiments described below, the set of data to be searched for is mapped into a RAM space i.e. as an 'object' stored in RAM. There may be one large RAM used, or several smaller RAMs used simultaneously. The 'object' is made up of a collection of "1"s. This object is then matched to an incoming data stream which undergoes a similar mapping.

For example, the data in the dictionary may be representative of a word or phrase and the incoming data stream may be representative of internet website data. In such an embodiment, the apparatus operates as a search engine. In another embodiment, the data in the dictionary may be representative of an image feature, for example facial characteristics, and the data stream may be indicative of images captured, for example, by a security camera. In such an embodiment, the apparatus operates as image recognition apparatus. In other embodiments, the dictionary may contain data which is sought in a database and the input stream may comprise data representative of the database. Other uses of the apparatus include modulation and demodulation of signals. In the description below, the data to be searched for is termed 'dictionary terms' or 'words', but, as will be appreciated from the above, these 'terms' may be indicative of any data, and are not limited to words, phrases and the like.

Figure 1:
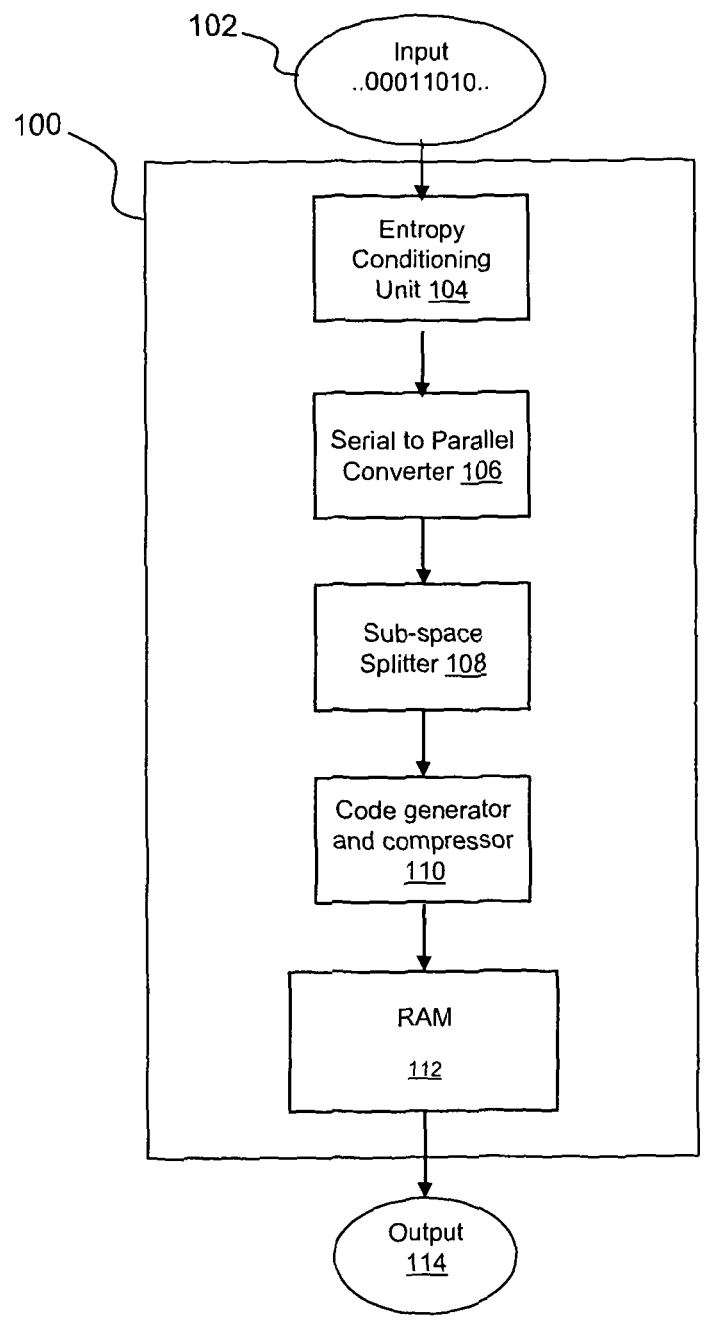
FIG. 1 schematically shows processing apparatus according to one embodiment of the present invention.

FIG. 1 shows a schematic view of the components of a processing apparatus according to a first embodiment of the present invention.

The apparatus 100 is arranged to accept an input 102, which may be the dictionary terms (although as described below, the dictionary terms may be entered by other means) or an input data stream. The input 102 is first processed by an entropy conditioning unit 104 where it is used to modulate multiple frequency laser light, as it will be explained in greater detail in relation to FIG. 2 (in other embodiments, the entropy conditioning unit 104, could be omitted or replaced for example with a simple on-off modulator). The light is then passed to a serial to parallel converter 106, which effectively produces a parallel signal which is indicative of a sample of the input data 102 taken from a number of points in the input data stream. The components of the serial to parallel converter 106 are discussed in greater detail in relation to FIG. 3. This parallel signal is in turn passed to a sub-space splitter 108, which splits the parallel signal into a number of 'words' (where a 'word' is a series of bits, each 0 or 1). The sub-space splitter 108 is discussed in greater detail in relation to FIGS. 4 and 5 and performs a hashing function as well as effectively slowing down the signals. The term sub-space is used because the large input space is mapped into a smaller space (or sub-space) defined by the size of the available memory.

In other embodiments, the system could be slowed down at other points in addition, or alternatively to, the sub-space splitter 108. For example, samples could captured less frequently) by sampling ever few clocks, e.g. every 8 clocks to test on byte boundaries, or by having parallel banks of RAM.

In this embodiment, the entropy conditioning unit 104, the serial to parallel converter 106 and the sub-space splitter 108 are all photonic devices.

The output of the sub-space splitter 108 is a set of sequences of parallel electronic pulses which are passed to a parallel bank of code generators and compressors 110. Although it is not essential that a parallel bank is provided, the amount of parallelism determines how much the signal is slowed down and will multiply any effect obtained from only performing a sampling function once every several bits. For example, if search is only required at byte boundaries and there are 8 parallel banks of code generators and compressors, the address rate to each RAM is reduced to 1/(8×8) i.e. 1/64 of the input data rate. Each bank is an electronic subsystem, taking the input pulses and translating them into RAM addresses.

The code generator and compressor 110 accesses RAM 112 (which maybe partitioned or 'factorised'). The RAM 112 is an electronic component.

The processes carried out by each component of the apparatus are discussed in greater detail below.

Figure 2:
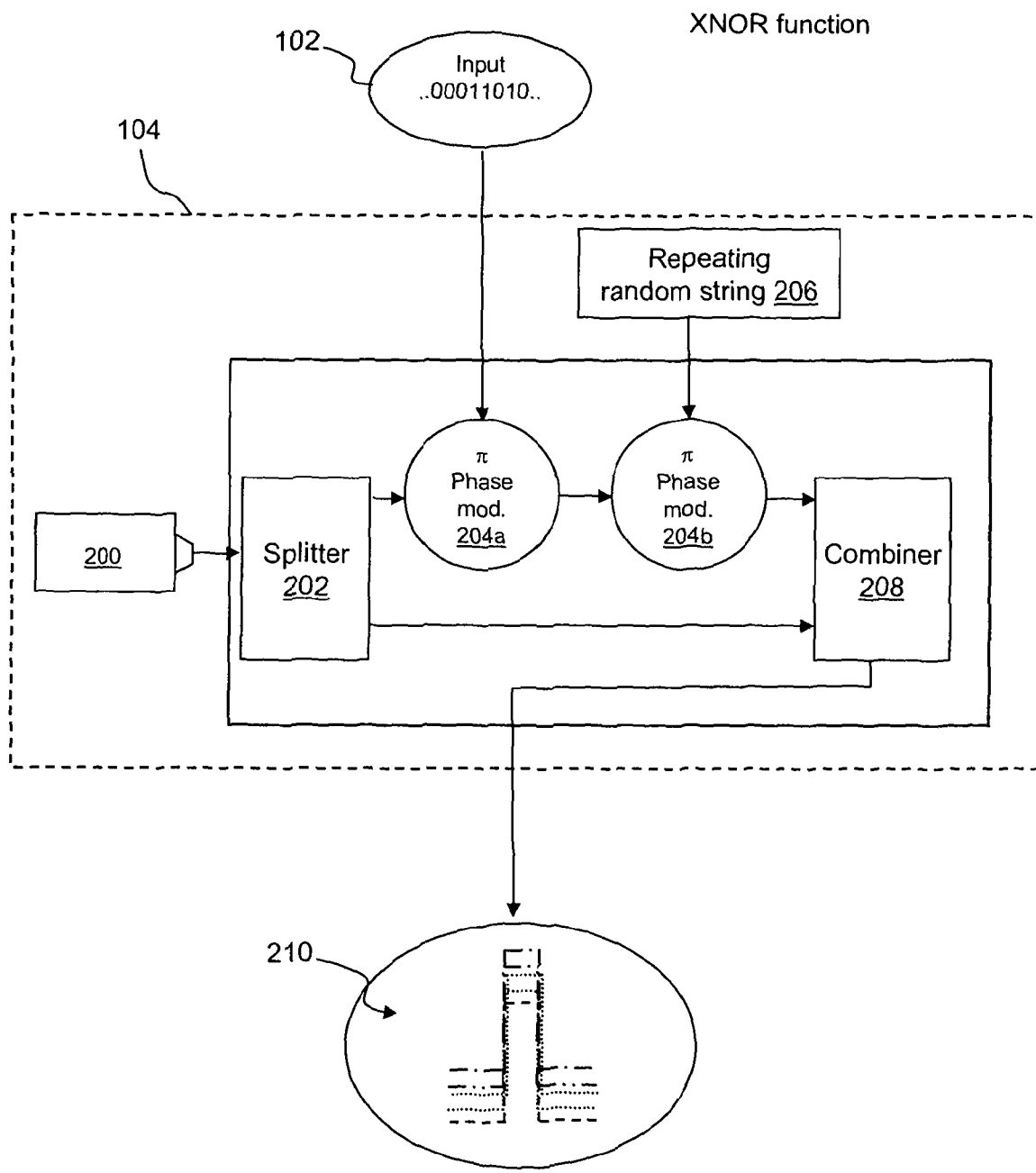
FIGS. 2 to 6 schematically show components of the apparatus of FIG. 1 in greater detail.

FIG. 2 shows the entropy conditioning unit 104 in greater detail. The entropy conditioning unit 104 comprises a laser source 200 which emits radiation at a number of different wavelengths. The number of wavelengths is chosen to be the number of bits which provide an n bit sample of the data stream. This is also the width 'n' of the parallel "word" that emerges from the serial to parallel converter 106 as discussed below. In this example, the wavelengths correspond to standard wavelengths used in Wavelength Division Multiplex (WDM) in optical fibres and the maximum number available is therefore about 160.

The individual frequencies or 'channels' in this embodiment correspond to different wavelengths which are in the near infra-red in the region of 1.5 micrometers. The number (n) of channels to be used is chosen in consideration of a number of engineering trade-off parameters and the required performance of the system. These trade-offs include consideration of the length of the dictionary terms, the number of terms in the dictionary, a required rate of slowdown for the signal, cost, size and complexity and the like. In the example below, 64 bit samples are used (i.e., n=64) where each sample later becomes offset by 8 but other sample sizes are possible and these determine the number of wavelengths used.

The input bit stream 102 is used to phase modulate the different laser frequencies in parallel. One technique to achieve this using a simple modulator is described in our international application WO/GB2005/004028, which is incorporated herein by reference, but other methods may be familiar to the person skilled in the art.

Light from the laser source 200 is split into two channels by a splitter 202, each with the number of wavelengths n as described above. In a first phase modulator 204a, the input bit stream 102 is used to modulate one channel of laser light by reversing the optical phase when a "1" is present, and doing nothing when a "0" is present. This is generically known as "binary phase shift keying". Similarly, a repeating random binary string 206, which has the same bit rate, and is synchronised with, the input data, is used by a second phase modulator 204b to re-modulate that channel.

This string 206 is 'repeating' in the sense that the same string is looped. This same repeating random number is used to process the dictionary terms and the input data streams to ensure consistent addressing to the RAM. The random number may however change if the dictionary and the search are re-initialised. Each of the RAM contents may need to take account of the timing of this number due to the overlapping sampling of the input data stream.

Practical engineering considerations mean that (for example, as discussed below) if tests are to be done at each byte boundary, the length of this word should be limited to 8 bits. However, if the output of the machine is switched between banks of RAM to slow down the access rate, the practical length of the randomising word may be multiplied by the number of the banks of RAM and the contents varied accordingly.

Hence, if the tests are to be made on byte boundaries and there are 8 banks of RAM, the repeating, consistent random string 206 will be 64 bits long. (In this case the access rate of the RAM will be 1/64 the optical clock speed).

In common with the input stream 102, the repeating random string 206 is electrical. The output is an amplitude modulated signal.

A combiner 208 then mixes the amplitude modulated output with the split-off component of the original laser output, ensuring that the optical powers entering the combiner 208 from each arm are equal in each channel. The effect is to output the "XNOR" (exclusive NOR) function of the input 102 and the random string 206.

The output of the entropy conditioning unit 102 is a multi wavelength pulse 210.

The entropy conditioning unit 102 may not be present in all embodiments. In other embodiments, an optical input may be provided. Alternatively, a digital input could be used to modulate a laser without being combined with a random string. Such a method is described in our international application WO/GB2005/004028, which is incorporated herein by reference. Another example is described in relation to FIG. 17 below. However, entropy conditioning may be desirable in some embodiments, in particular when the entropy of inputs or dictionary terms is low. This occurs because, in reality, the dictionary and/or the input data stream 102 may not be fully random, i.e. the signal entropy may be less than 8 bits per byte (1 byte=8 bits). For example, text is typically approximately 3 bits per byte.

That could cause the inputs to cluster in a small region of the sub-space memory used in the system (depending on design parameters used in the rest of the system) and lead to inefficient operation. Using an entropy conditioning unit 102 as outlined above randomises the input in the sense that input patterns that are close in terms of Hamming distance are projected into the sub-space such that the Hamming distance between corresponding locations in the sub-space is random and therefore likely to be comparatively large.

For example, 0000 ... all zeros ... 0000 0001; 0000 ... all zeros ... 0000 0010; and 0000 ... all zeros ... 0000 0011 may, under some circumstance or configurations of the system, be likely to generate very similar addresses. After (consistent) randomisation of each input to the system, the apparatus will generate "significantly different" addresses for input patterns which are similar or almost the same. Conventional hashing functions such as an "XOR" or "XNOR" tree may not achieve this.

Equally, the entropy conditioning unit 102 could be used with other systems to ensure an even spread of data throughout a memory space. Such systems may for example include known correlators, caching systems, or bulk data storage systems.

The functional structure of the system assumes (or, in the above embodiment, the entropy conditioning unit 102 ensures) that both the dictionary terms and the input bit stream are 'random', i.e. the system does not assume anything about the input data. In that way, the apparatus 100 is uncommitted to, and unaffected by, any structure in the dictionary or the signals.

Figure 3:
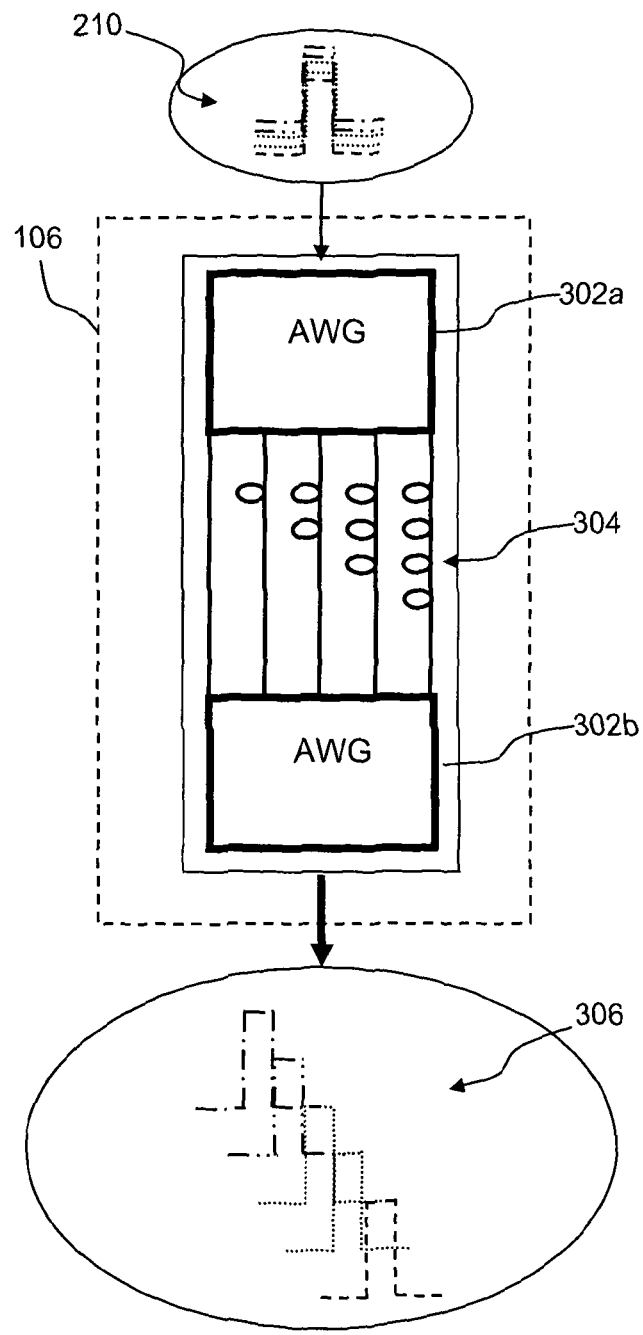

Turning now to FIG. 3, the multi-wavelength pulses 210 are then passed to the serial to parallel converter 104. Specifically, the pulses are fed into an Arrayed Waveguide Grating (AWG) 302a. This has the effect of separating the input signal into the wavelengths present and sending each individually to the same number of transmission fibres 304. This can be viewed as separating the input signal into 'colours' (although it will be appreciated that these may not be 'colours' in visible light). Each fibre is of a different length and therefore the transmission time of the light through the fibres is different. The separate signals are then re-combined using a second AWG 302b.

This has the effect of sampling the input signal at n different points and assembling them into an output 306 comprising sequential parallel 'words', each of which is n bits wide and contains a full set of n wavelengths, where each of those may be a "1" (on) or a "0" (off). In this example, the fibre carrying wavelength $n_1$ delays by 0 clock pulses, $n_2$ delays by 1 clock pulse, $n_3$ delays by two clock pulses up until $n_n$ delays by n−1 clock pulses. However, in other examples, other schemes may be used to sample the signal in different ways depending on the system architecture, system requirements and engineering trade-off parameters.

The output word (the width of which corresponds to the number of wavelengths) therefore represents a series of samples of the input data stream. These samples may or may not be consecutive, depending on the system design. A similar method of producing such a parallel 'sample' of the input data is described in greater detail in PCT/GB2005/004028 which is incorporated herein by reference.

In some embodiments, the fibres 304 which provide delay lines may comprise lengths of fibre that are switched in and out so that programmable characteristics may be achieved. For very short delays, such as may be required when very high data rate signals are input (e.g. more than 10 Gigabits per second), integrated optics in the form of optical waveguides fabricated from a suitable substrate may be used in place of lengths of fibre.

The parallel word output 306 represents a sample of the input stream and therefore in this embodiment, the entropy conditioning unit 104 and the serial to parallel converter 106 have acted as a sampler to provide a sample of the input data stream 102.

Figure 4:
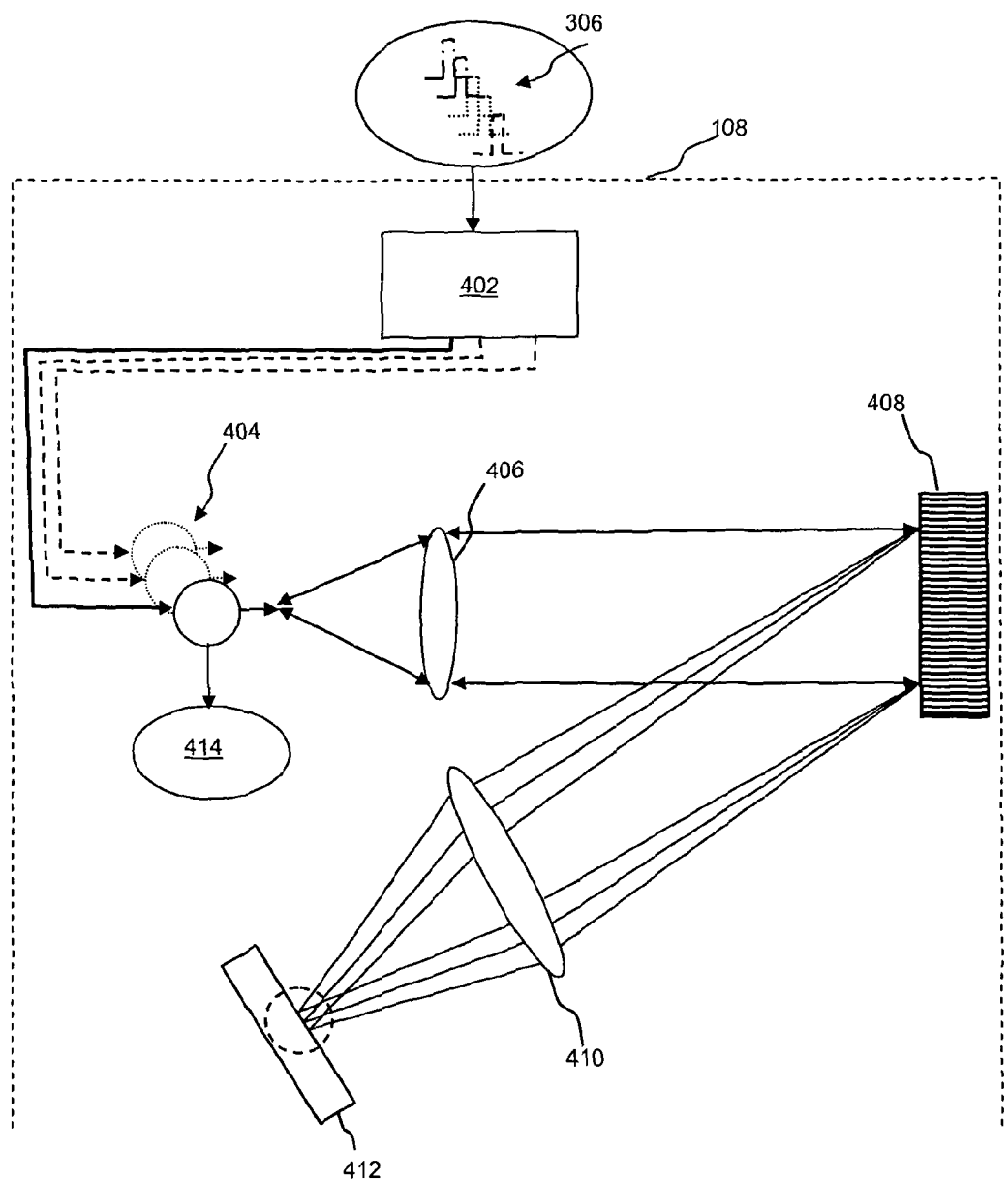
Figure 5:
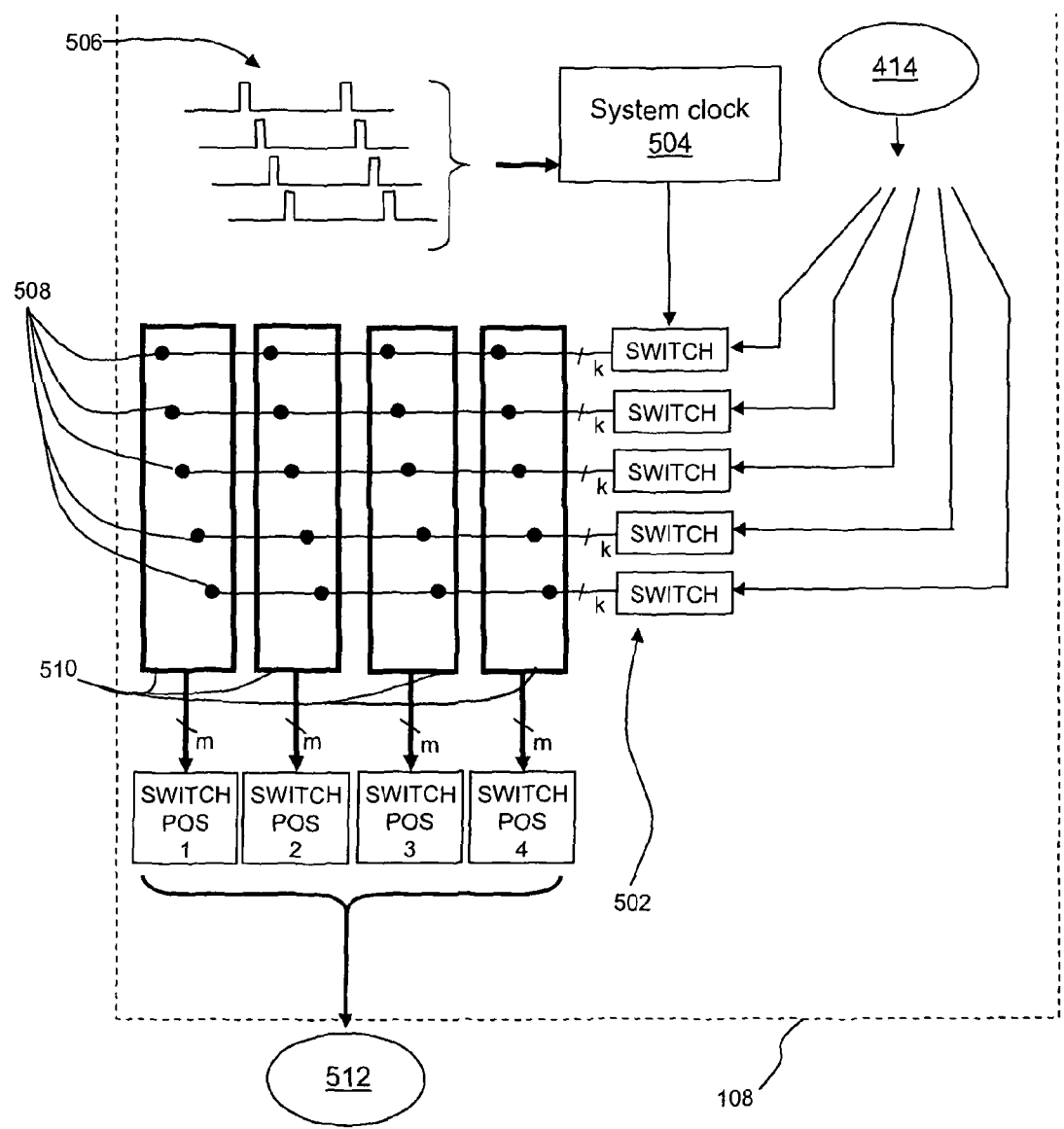

The parallel word output 306 is then passed via a single fibre to the sub-space splitter 108, the architecture of which is shown schematically in FIGS. 4 and 5. In this embodiment the sub-space splitter 108 is suitable for operation at rates greater than 10 Gbit·s−1.

As can be seen from FIG. 4, the series of parallel words from the output 306 is fed into an m-way splitter 402. The number m is chosen to be of a size suitable for the engineering trade-off parameters and performance requirements. Each of the m channels proceeds through the apparatus 100 via a circulator 404. As will be familiar to the skilled person, a circulator takes a signal through any of (in this example) three ports such that it always emerges from the next, and only the next, port in this case in clockwise order in FIGS. 4 and 5.

The row of m signals is then collimated by a lens 406 (which in this example has a focal length of around 50 mm and a diameter of 10 mm) and passed onto a grating 408. The grating 408 spreads each of the m signals into a line, which is focussed via a second lens 410 onto a micro-mirror array 412. In that line, the wavelengths are separated such that each channel impinges on a single line of micro-mirrors, thus forming a row of signals n bits long. Each of the m channels is arranged such that it impinges on a different row.

In this example, the second lens 410 has a focal length of around 100 mm and around a 42 micron/nm shift and a 20 micron spot size. The grating 408 is a 2.5 micron pitch grating which gives a first order at 36 degrees for 1550 nm and has a rate of change of around 0.012 degrees per nm. The micromirror array 412 is a MEMS/DLP modulator array which directs deselected wavebands outside the optical system and/or minimises reflectivity.

In the micro-mirror array 412 there are m rows of n channels arranged as columns, forming an m×n array. The micromirrors are populated with m strings of length n (organised into m rows to correspond with the m input beams) which, in this embodiment, are randomly drawn from a subset of all possible binary strings of length n that have a certain number of "1"s present (the choice of the number of "1"s is explained below, and is driven by design trade-off considerations), each row having a different permutation of the positions of the "1"s. The strings are chosen randomly by the apparatus (which therefore acts a string selector) but are consistent in that they do not alter between loading the memory with appropriate patterns and the corresponding measurement functions; each row represents a different random string. These strings may be, but are not necessarily, known by the programming device that sets the patterns to be sought. If the strings are known, the dictionary can be programmed into the memory by 'mimicking' the action of the apparatus 100, rather than by processing the dictionary terms using the same hardware (i.e. the photonic apparatus described above) as the input strings.

The micro-mirror array 412 may be reprogrammed with new random numbers but the array remains consistent for a single session of dictionary searches such that the same m random numbers are used to process both the dictionary terms and the input samples. This allows consistent addressing (i.e. if an input sample matches a dictionary term, it will be mapped to the same location in the memory as that dictionary term).

When each single micro-mirror is in a "1" position it acts as a retro-reflector, sending the individual beam back down the direction from which it came. If it is set at a "0" position, it sends the beam out of the apparatus (i.e. the energy is "dumped" or lost).

Therefore, there is only a "1" reflected back when both the individual beam component and the corresponding micro-mirror is in the "1" state.

Effectively, this method therefore applies a "bitwise AND" to the signal. A "bitwise AND" means that the output appears at any given wavelength coming back through the circulator 404 if and only if both the wavelength was present on the signal and the corresponding micro-mirror was set to a "1". As the position of the mirror is populated with a random string, the bitwise AND means that each bit of the output word 306 is set to "1" only if a "1" is present in that position in both the input word and the random word. The micro mirror array 412 therefore acts as a logical operator.

For example, if the parallel word input 306 is 1001 0011 1010 1100 and the random word is 1010 0010 1001 0110, then the output is 1000 0010 1000 0100. There are always less than or (occasionally) the same number of "1"s in the output word as the random word. This may have the effect of easing the design requirements of detectors within the apparatus 100, which are described below.

In this example, the m patterns on the micro-mirror array 412 are chosen to have odd numbers of "1"s in each pattern up to a maximum of (n/2)−1 (it will be recalled that the parallel 'words' representing samples of the input data were n bits wide). As a result, the maximum number of wavelengths reflected from any of the m random words of length n is (n/2)−1. That means that if the input samples of length n are derived from a random signal, the probability of the output word that represents the bitwise AND function containing (n/4) or more bits set to "1" is 0.5, and the probability of it containing (n/4)−1 or less is also 0.5 when the word contains (n/2)−1 "1"s. In a similar manner, when (for example) the number of bits in the random word is (n/2)−3 then the threshold where the probability becomes 0.5 is where the number of "1"s exceeds (n/4)−1½%.

As an example, if n=16 and the number of "1"s in each of the m rows on the micro-mirror array 412 is chosen to be 7, there are 11,440 possible permutations available and therefore a maximum of m=11,440 different rows. However, depending on the nature of the input signals expected it is sometimes advantageous to choose a distribution of different numbers of "1"s to be present in these random patterns (for example, one row could have 7 "1"s, another row could have 5 1"1"s, etc) and set the subsequently applied thresholds accordingly. If the probability of exceeding the threshold is required to be 0.5 (as in the currently described embodiment) then the number of "1"s in the random word needs to be an odd number that is less in value than the number of available locations. Therefore, if the rows are populated with 16 bit words, where there are 7 "1"s on a row, the threshold of the associated detector will be set to 3.5, if 5 "1"s on a row, set to 2.5, if 3 set to 1.5 and if 1 set to 0.5.

If the optics does not have enough finesse to focus each wavelength of each beam separately, "guard bands" of micro-mirrors that are non-functional may be employed to ensure the beams do not overlap.

The reflected beams return to the circulator 404 in each case. Each beam at each circulator 404 is a "bitwise AND" of the input and the particular row that it has impinged on. The output 414 from the circulator 404 is an output word and each bit of the output word set to "1" is represented by the specific wavelength present in that position in the word. There are m outputs each contained within a single fibre.

This process effectively provides a hashing function within each sample set of length n (i.e., each 'word' has been hashed independently). Therefore, the output word is referred to as the hashed word 414. There may be further hashing functions depending on the configuration of the apparatus 100, as discussed below.

As can be seen from FIG. 5, each of the m outputs 414 from the individual circulators 404 travels to a k-way switch 502 (where k is a positive integer>0: in the Figure, and for simplicity, k=5 but in practical embodiments k might typically be, for example, 8 or 16). Each of the k signals may have differing numbers of wavelengths present (and some may have none).

In electronics terminology, there is a k-way m pole optical switch 502 operated by a k phase clock 504 derived from an input optical clock signal 506 suitably reduced in its total period by the sampling rate. Each bank of m outputs appears in turn at a different phase of the clock input set 506. The periods are chosen in such a way that each bank of outputs is available in turn at the sampling rate divided by k. For example, if the input is required to be tested at byte boundaries and k=8 then the sampling rate at the end of the delay lines will be the optical system input clock rate divided by (8×8) i.e. 64. Hence, each of the outputs will appear at a rate of 1/64 of the input data rate.

Figure 11:
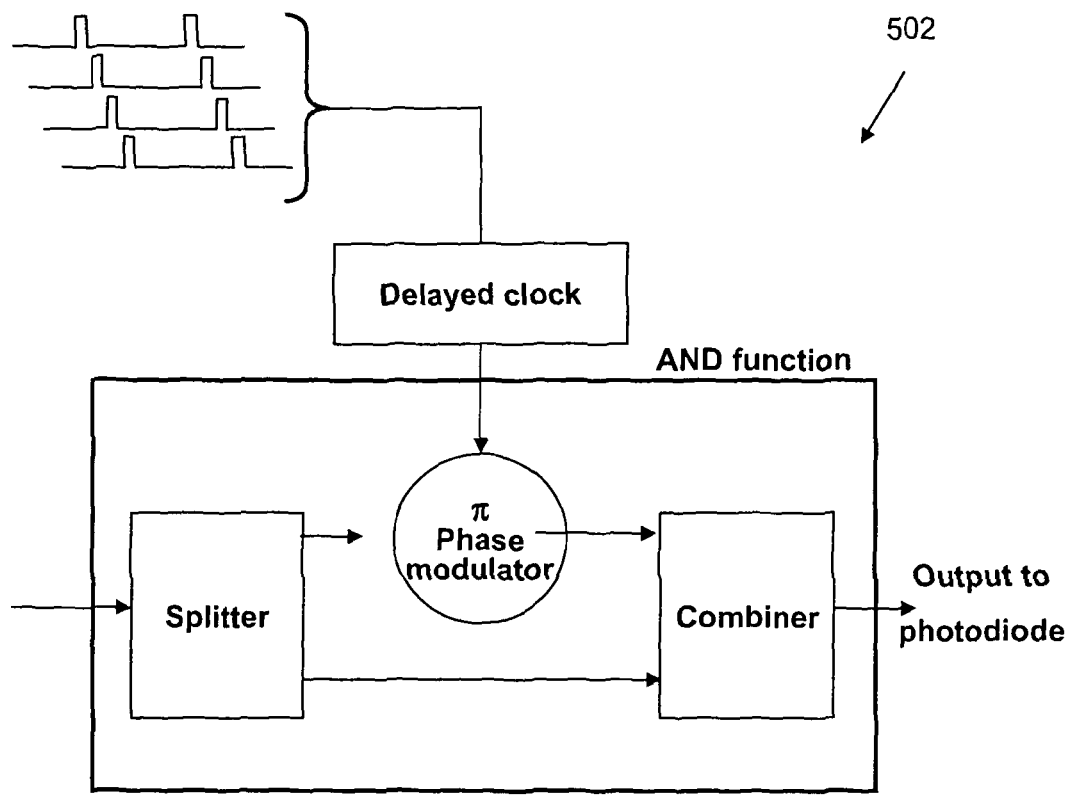
FIG. 11 shows one embodiment of an optical switch.

An example of a switch 502 which could be used is shown in FIG. 11.

The output of each switch 502 is a set of k signals which is passed down k wires to a series of photo-detectors 508 (as will be familiar to the skilled person, the notation/k shown in relation to lines of the drawing indicates that the line represents a bundle of k wires or optical fibres according to context). There are k×m photo-detectors 508 (in this example, photo diode arrays) present on the output of each of the switches 502 (each dot on the Figure represents a photo-diode, but only some of these are labelled for clarity. Each 'row' on the Figure represents a k×m photo-diode array and each column represents one position of the switch 502. Although the Figure shows 4 columns, k columns are provided). Each photo-detector 508 is attached to its own pulse generator and arranged to produce an output (a "1") with a probability of 0.5. In other words, each photo-detector 506 is arranged to trigger a 'monostable' according to the timing of the k phase clock 504. A monostable in this context is an electronic circuit designed to trigger when a pulse of light beyond a certain threshold energy appears at the photo-detector 508; the output of the monostable is a pulse that is stretched such that the electronics that follow may reliably read the pulse to be a "1".

The photo-diodes 508 and monostables are set such that the probability of a pulse being generated is as close as possible to 0.5 when the input samples, each of which are n bits long, are random. Different photo-detectors may be set to different thresholds according to the number of "1"s in the random word stored on the micro-mirror array 412, as previously described.

In practice, small deviations from a probability of 0.5 will not greatly affect the operation of the system and there may be circumstances in which the probabilities would be deliberately 'unbalanced' to achieve certain desired effects.

The outputs 512 comprise a vector of length m for each of the k positions of the switch. These vectors 512 are sent to the next module of the apparatus 100, the code generator and compressor 110.

Figure 8:
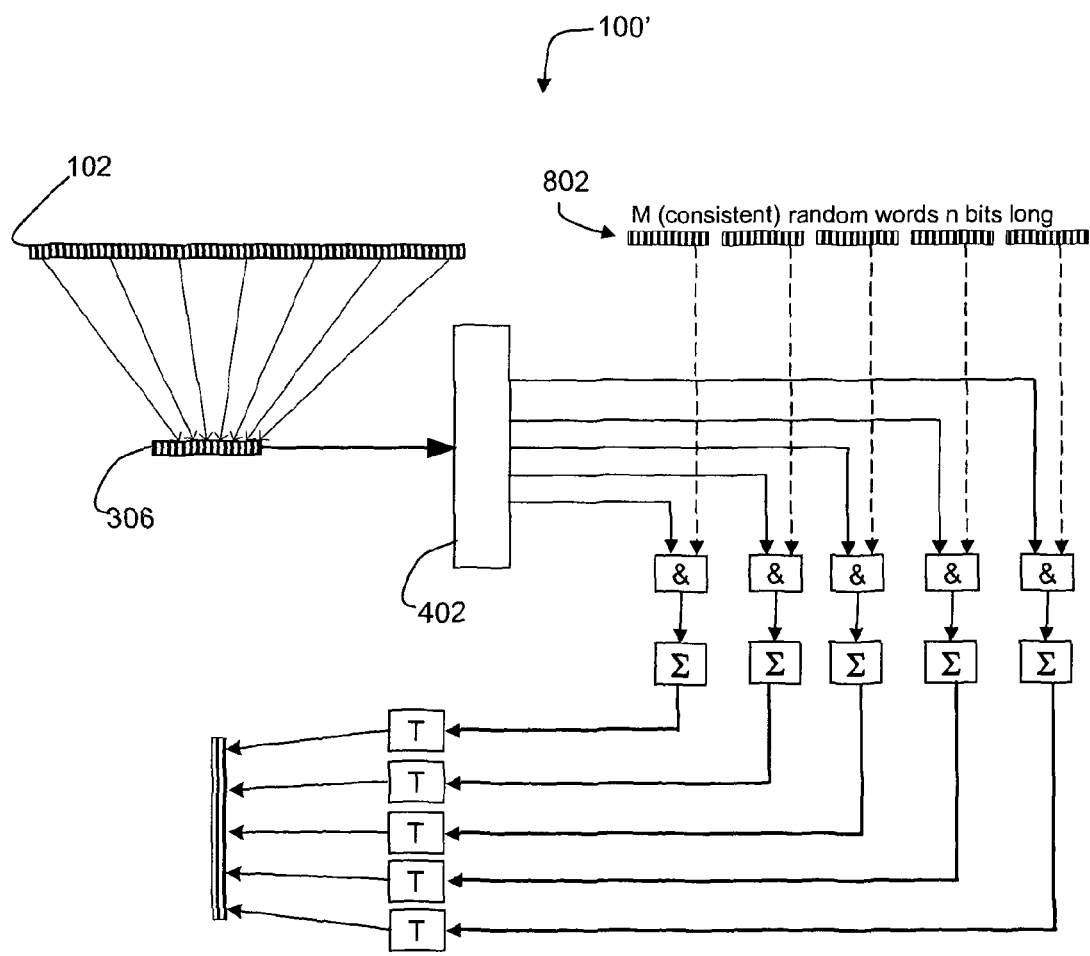
FIG. 8 shows an alternative embodiment of a processing apparatus.

The effect of the k-way switch 502 is to parallelise the system, which allows slower operation of components 'down stream' of the k-way switch 502. Therefore, the k-way switch 502 may not be required in slower systems, for example operating at less that about 10 GHz. In such systems, as alternative would be to parallelise the electrical signal which may be produced by the photo detectors 508. Such an embodiment is shown in FIG. 8.

An aim of the apparatus 100 is to provide an address, either for mapping data representative of a dictionary term into the RAM 112 or to check to see if the input data contains a dictionary term. Production of the address is repeated separately k times in the system.

The inputs 512 derived from the sub-Space splitter 108 will be a complete m×k matrix.

Figure 6:
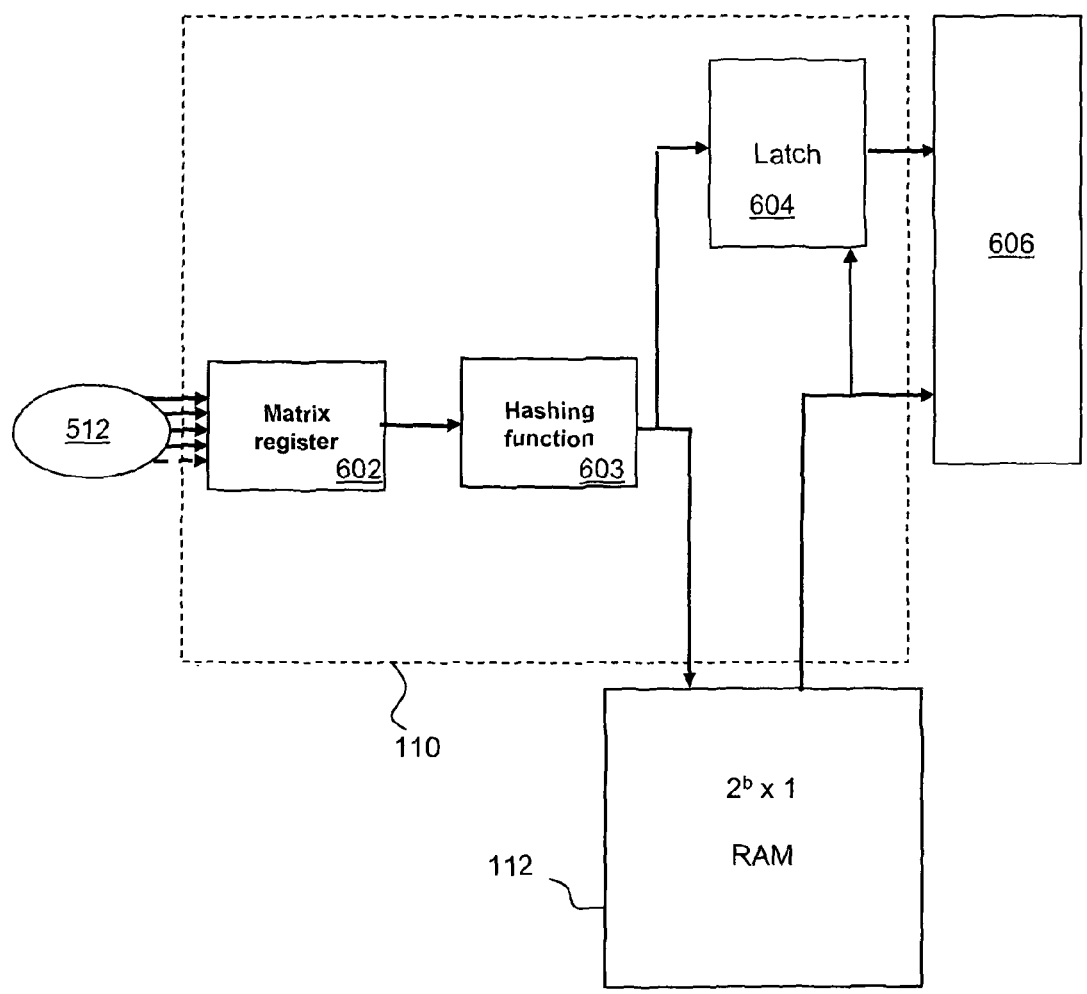

Each of these is fed in sequence to a one bit deep memory via a matrix memory 602 as an address. In this example, the code generator and compressor 110 and the RAM 112 shown in FIG. 6 are actually repeated 8 times, each being copies of one another. Each is addressed in turn, which slows down the access rate of the memory. This is done by latching the matrix 512 produced into each matrix memory 602 in turn every time a full matrix 512 is completed. This may place certain conditions on the sampling interval via the choice of delays in the serial to parallel converter 106. Therefore, in this embodiment, and by this method, the matrix 512 is multiplexed (i.e. switched between banks of RAM) after detection by the photo detectors 506.

In other embodiments, non-identical banks of RAM may be provided.

In some embodiments, the matrix 512 will be designed to match the input address space (or 'code space') of the RAM 112. However, in other embodiments, such as shown in FIG. 6, the number of address lines will exceed that required to address a realistic size of memory (i.e. the required RAM 112 would be too large). In such embodiments, further hashing may take place in order to reach the design criterion. In the example of FIG. 6, an XOR or XNOR tree could act as an address generator and be used in the hashing function 603 to reduce the number of lines to the desired value of b (where b is the number of bits in the total RAM address space). Usually, any hashing function 603 would be chosen to reduce the k rows of the address matrix (formed in 602) to separate segments of the RAM address so that cross-correlations between each of the k n bit samples may be taken into account.

Figure 9:
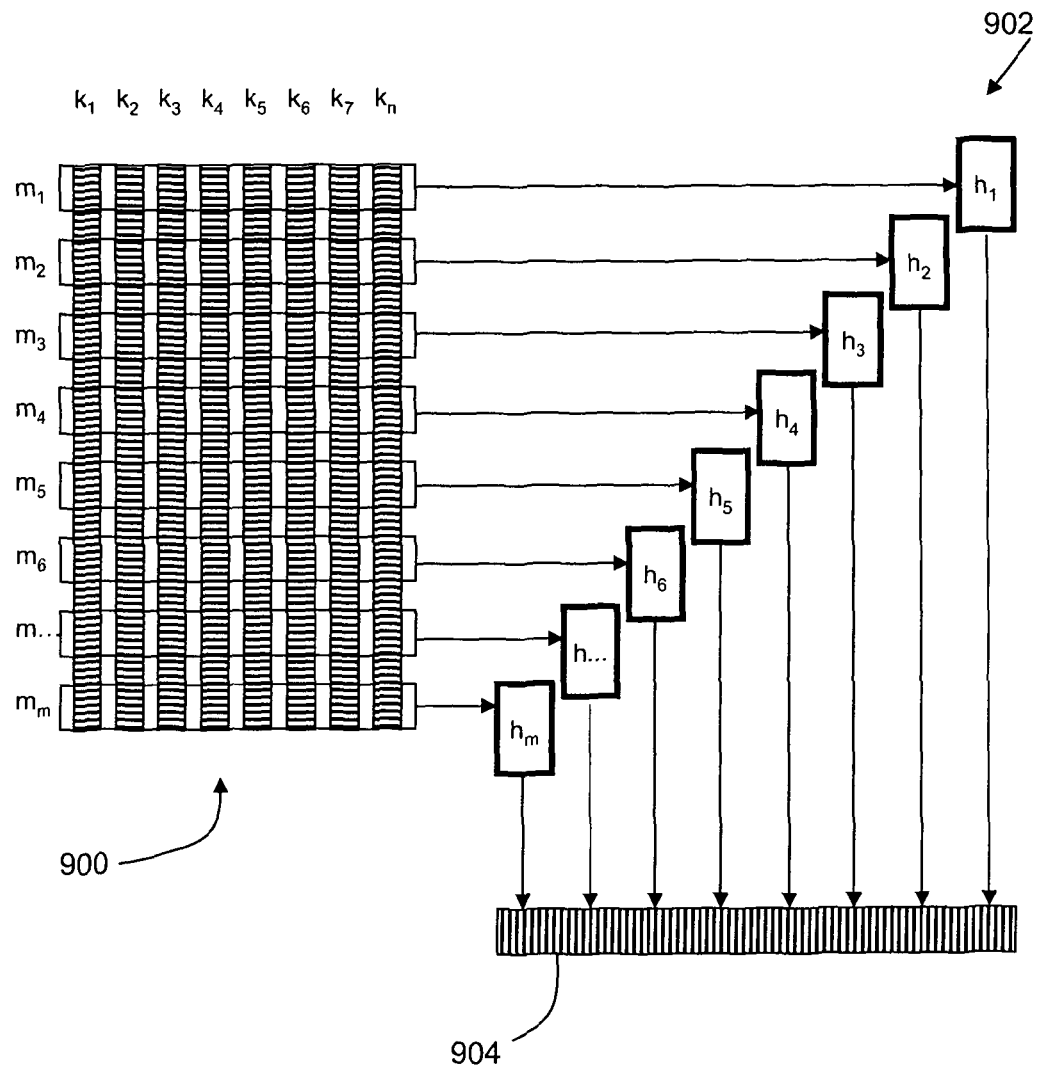
FIG. 9 schematically shows an embodiment of RAM address generation.

An alternative view of this process is shown in FIG. 9. The output of the sub-space splitter 108 forms an m×k matrix 900. Each row of this matrix (a 1D matrix of length k) is either retained in a complete form (if sufficiently small), or, more usually, and as shown in FIG. 9, subjected to a hashing function 902 (which therefore acts along with the sub-space splitter 108 as an address generator is such embodiment) and used to generate a complete RAM address 904. Optical switching is performed such that banks of photo-diodes 508 are triggered in turn (i.e. each column in the matrix 900 is associated with one bank of photo-detectors 506. This reduces the repetition rate required at the photodiodes by a factor of k. The matrix 900 is stored in or on a number of latch registers each associated with a specific RAM. In such a system, each register need operate only at the rate of complete matrix formation divided by the number of repeats of the code generator and compressor 110 and the RAM 122 (i.e., in this embodiment, 8) taken together.

In summary therefore, as sets of n samples are taken at the front end, the matrix 900 is built up (usually, in this instance, k columns) and segments of the address are created from the rows of the matrix 900. This allows the apparatus 100 to obtain knowledge about correlations between the sets of n samples, rather than just correlations within each. This is also a hashing function but can occur at a fraction of the fast input clock.

For the task of correlation, the address segments 904 are chosen to match the requirements of the task and yet are small enough to be practically and affordably realised.

Figure 10:
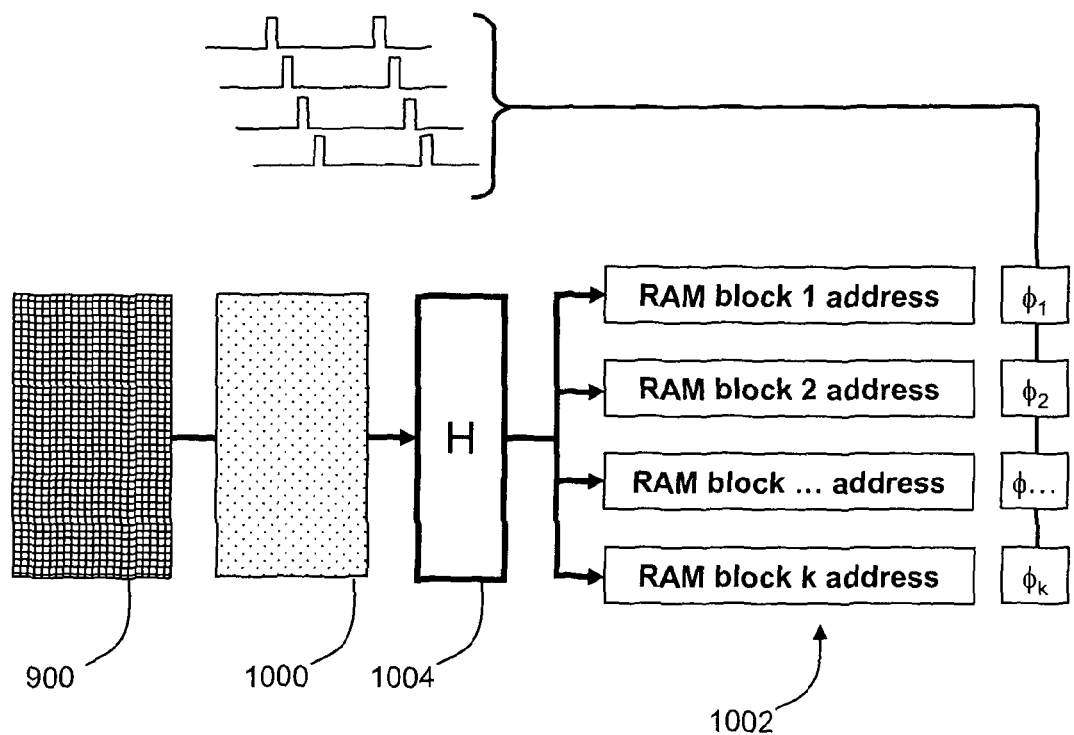
FIG. 10 shows the use of a shadow register in one embodiment of the invention.

In other examples, as shown in FIG. 10, the photo-detectors 508 may be capable of operating sufficiently quickly that they can be addressed at the system clock rate to generate words that form the m×k matrix 900 from which the addresses 904 are generated. Each column register in the matrix 900 will need to be updated at 1/k of the system clock divided by the sampling rate if less than the input data rate (for example, where testing only on byte boundaries is required).

In such a case, the switch to the RAM blocks (or RAM banks) can be implemented by placing the RAM blocks in parallel and sending write pulse to each in sequence every time a new matrix 900 is completely re-written. The φ functions illustrated are the phases of the write pulse, i.e. each RAM is asked to take their input address from the matrix 900 in sequence.

Since the columns are updated sequentially and a snapshot of the entire matrix 900 used to form an address every k cycles of the input clock, a shadow register 1000 may be used to hold the entire matrix 900 for a sufficient length of time for the RAM address lines generated via the hashing function 1004 (if one is necessary) to settle.

The shadow register 1000 in this example is a small piece of fast, dual-port RAM where the matrix 900 is written column by column into the matrix registers and at the end of the n×kth cycle the entire matrix 900 is rapidly clocked into the shadow register 1000.

Each RAM block 1002 will be addressed in turn every time the shadow register 1000 is loaded with a new matrix. Usually, this is a cyclic, repetitive process.

The output of the system will be a "1" if a member of the dictionary has appeared on the optical input fibre, and if the output is a "0" then the input sample definitely is not a member of the dictionary. Occasionally, a false alarm will be generated (i.e. a "1" is output when the input is not a term in the dictionary), but a match will never be missed.

In the embodiment of FIG. 6, the processor comprises a latch circuit 604. In the event of a match, the latch circuit 604 is signalled to send the memory address to a post processor 606 (which may be a local or a remote system). The memory address usually defines either a single dictionary term or a very small subset of dictionary terms that may have been found. The post processor 606 then finds the word which has been detected by using a suitable look-up table or similar such technique. If no matching word is found by the end of this (usually short) search, then it can be concluded that a false alarm has occurred.

Figure 7:
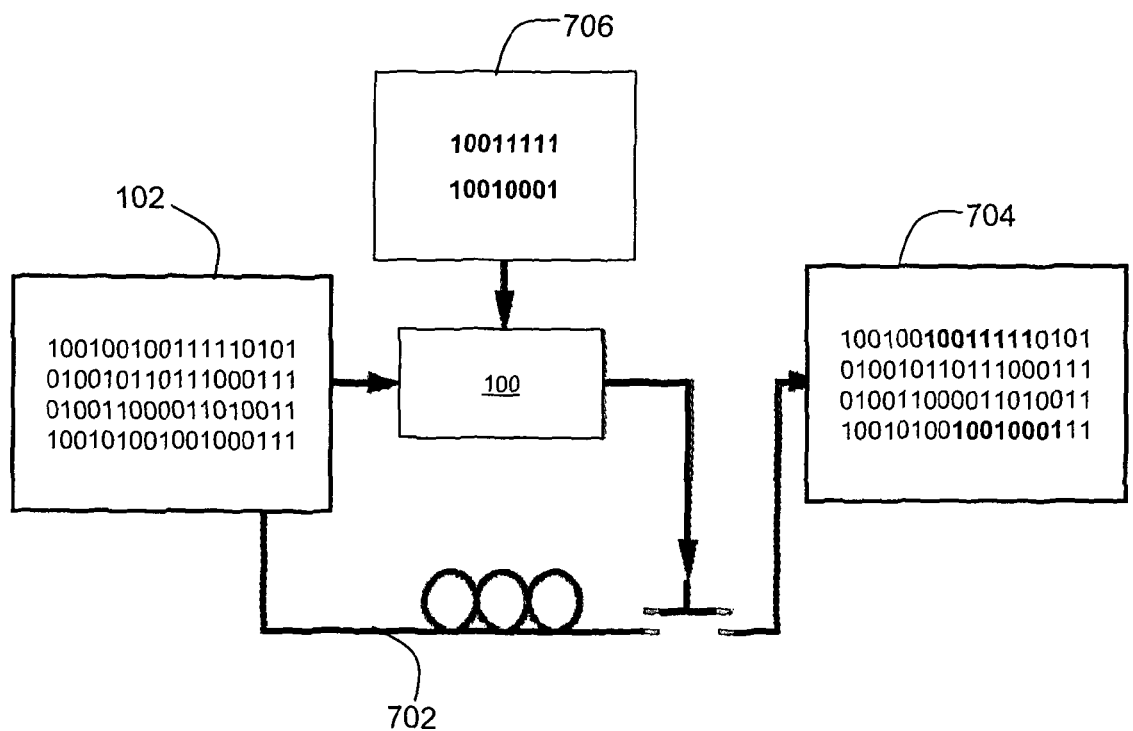
FIG. 7 schematically shows a high level view of one embodiment of the apparatus in operation.

If, as is shown schematically in FIG. 7, the optical input is held in a ring buffer (which in this example comprises a delay line and serial in, parallel out register 702, but could be provided by a looped shift register or similar device), for sufficient time, the candidate word may be extracted therefrom. In FIG. 7, the output includes not just the candidate word, but also the words in the vicinity of the sought pattern, or in a given time interval or intervals before or after (as shown in output 704). FIG. 7 also schematically shows the dictionary 706 as an input to the apparatus 100.

FIG. 8 shows an alternative view of a processor 100', which in this embodiment lacks k-way switching of the signals. Features in common with the processor 100 described above are labelled with like numbers. This processor 100' is intended to operate at a slower data rate than the system of FIG. 1 (e.g. up to approximately 10 Gbit·s−1). The function of the micro mirror array 412 is illustrated by a set of random words 802 and a bitwise AND bank 804. Each of the m outputs is fed directly to a photo detector which is set up to trigger a monostable (pulse generator) with a probability of as close as possible to 0.5. In FIG. 8, the boxes labelled T 806 indicate a photo detector and pulse generator combined.

In such examples, the output of the monostables (pulse generators) may be fed to shift registers clocked at a rate of the input signal divided by the sampling rate. For example, when the system is set up to sample on byte boundaries, the shift register 808 should be clocked at ⅛ of the data rate of the optical fibre input bit stream. The shift register 808 is m bits wide by k bits deep, i.e., there are m 1-d shift registers. However, for reasons of clarity, only the first k-column m bits wide (positioned vertically) is shown in FIG. 8.

Figure 17:
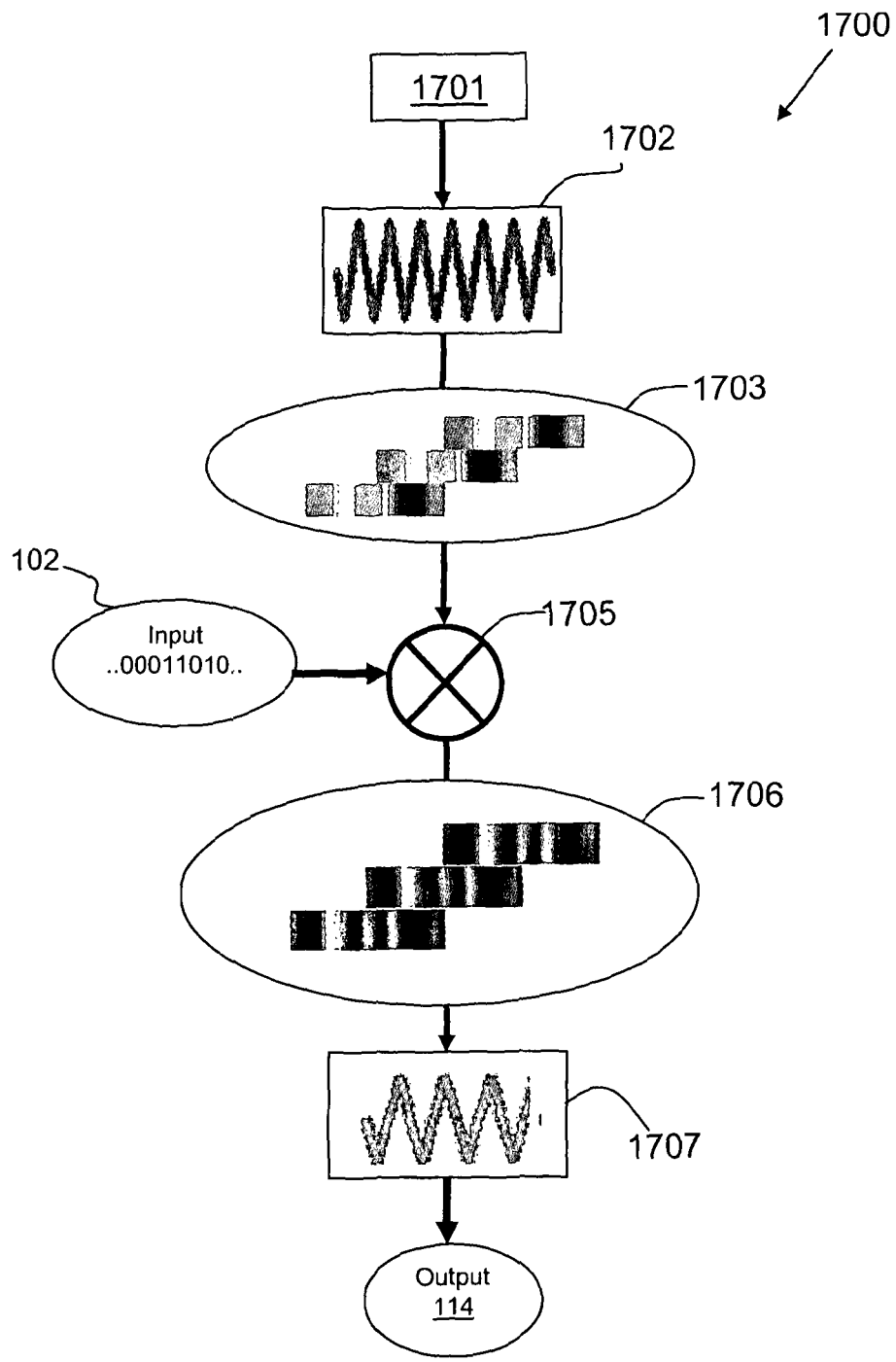
FIG. 17 shows an encoder according to one embodiment of the invention.

A schematic view of an alternative embodiment of a component of an optical processor is shown in FIG. 17. In this embodiment, an encoder 1700 is provided to provide an optical signal from a digital input 102. The encoder 1700 comprises a light source 1701 that emits a repetitive sequence of narrow (i.e. of short duration) pulses of broadband light. This light could for example be contained within the infra-red area of the spectrum defined by commercial telecoms bands where off the shelf components and materials are readily available. For example, the light source 1701 could be a femtosecond laser. Each pulse emitted to by the light source is passed to a dispersive medium 1702. The dispersive medium 1702 is arranged to stretch the pulse such that a spectrum 1703 is produced (i.e. the wavelengths contained in the broadband light are stretched so that the pulse appears as a 'rainbow' of the wavelengths contained therein) of a duration that is at least as long as the interval between the broadband pulses, causing them to overlap. In the example shown, the 'rainbows' overlap such that that continuous bit sequences (or, if testing on byte boundaries, every byte boundary sample) are contained therein. The pulses are therefore longer than the length of the dictionary terms sought. These stretched pulses therefore appear as 'chirps', i.e. signals that scans through the frequencies, and each scan of frequencies is a chirp. In this example, the dispersive medium 1702 is an appropriate length of dispersive fibre, but other dispersive mediums, e.g. a Fibre-Bragg Grating (FBG) with progressively spaced grooves, or two Array Waveguide Gratings (AWG) linked by delay lines of different lengths, will be familiar to the skilled person.

In this example, the repetition rate of the pulses is constant and a sub-multiple of the system clock.

The digital electronic data signal 102 to be analysed is imprinted on the succession of chirps, for example by a commercially sourced modulator 1705. All the information present in the signal remains embedded in modulated chirps 1706. Therefore, the modulated chirps 1706 may be manipulated in such a way that subsequent processing is facilitated. In this example, they are passed through a dispersive medium 1707 with opposite characteristics to the item used to spread the original pulses into chirps, for example a Fibre-Bragg Grating (FBG), or two Array Waveguide Gratings (AWG) linked by delay lines of different lengths. This has the effect of re-assembling the chirps into pulses whilst retaining the signal information in the pulses encoded in the frequency If required, the signal pulses could be amplified at any stage by an Erbium Doped Fibre Amplifier (EDFA).

The sequence of signal pulses could then be split into a number of similar, parallel signals that enter a ribbon of fibres, for example as shown in FIGS. 3 and 4. As is shown in FIG. 4, each fibre may be connected to a circulator 404 such that the pulses are emitted into free space.

There are other ways of encoding an optical signal with the input data stream 102. For example, the light source may be a continuous wave (CW) laser emitting a relatively broadband signal and the signal could be encoded directly with a regular pulse train by a modulator. The pulse train selects every $j^{th}$ pulse at the input data rate. Large values of j decrease the effective output data rate allowing for use of lower bandwidth detectors. For example, j may be 1, 32 or 64. As will be appreciated by the skilled person, CW lasers are generally more readily available than the Femtosecond lasers described above.

In one such example, a CW source is encoded by the input 102, which acts as a 'pulse selector', selecting pulses that will be added by the pulse train. The pulses are then stretched and encoded by the regular pulse train. In fact, as will be appreciated by the skilled person, it does not matter whether the CW light is encoded with the input 102 or the regular pulse train first. However, the pulse stretcher can be removed if the input 102 is added, the pulses compressed and then the pulse train applied, and the optical system may thereby be simplified.

In a further alternative, an optical router (or a network thereof) may be used to switch different pulses down different fibres. The selected pulses may then be synchronised at the detectors by adding a delay in each route. That way, no extra 'colours' will be needed to cover the intermediate byte boundaries (i.e. the overlap of the pulses can be reduced). In the above examples, if, for example, the dictionary contains 32-bit words, then pulses are selected every 32-bits and 32 'colours' are used. In order to look for patterns starting on the intermediate byte boundaries using the system proposed in relation to FIG. 17, 8 additional colours are required for each extra byte boundary. The micro mirror array selects the range of colours for each byte boundary. However, alternatively, pulses may be selected every 8-bits and these pulses may routed cyclically down 4 separate fibres. In this way, 32 colours are sufficient to examine every byte boundary.

The number of different routes and colours can be optimised for different circumstances. This would require the downstream components to be replicated such that, in the example of 4 separate fibres, there would be 4 micro mirror arrays (or more fibres and a large micro mirror array), etc.

Further, as has been described in relation to FIG. 4 above, the output radiated from the row of fibres can then be focussed by a lens arrangement on to a micro mirror array 412 (e.g. a Digital Micro Mirror (DMM) array) via an appropriately chosen grating 408. The grating 408 reflects the different frequencies present in each pulse through a different angle. This has the effect of stretching once more the pulses that were originally stretched in time to form chirps and then re-compressed, only this time the expansion of the spectrum is in space across the micro mirror array 412 (and only in time insofar as there may be small path differences associated with the different wavelengths). These new, spatially stretched spectral pulses are projected on to lines along one or more rows on the micro mirror array 412. Each fibre focuses on to a different row, or sets of rows, of the micro mirror array 412. In some circumstances, the rows from each fibre may be permitted to overlap to achieve more sophisticated processing capability. The micro mirror array 412 is positioned such that if a mirror was not set to deflect in any specific row and column location, that would represent a "1" and the light impinging on the specific micro-mirror concerned would retro-reflect, and continue back via a reciprocal path through the system as far as the circulators 404. If a particular mirror was set to deflect the light away from the reciprocal path the light in this example, it could be discarded and that would represent a "0". Alternatively, discarded light could be interpreted as a "1" and retro-reflected light following a reciprocal path could represent a "0".

In other embodiments, a transmission system could be used where a Spatial Light Modulator (SLM) could be employed instead to allow or block the forward transmission of light, representing the "1"s and the "0"s in any manner desired.

The light in the return beams impinging on the circulators 404 exits at the third port, away from both previous inputs, to provide an output 414 which is focussed on a row of photodiodes. In this embodiment, the processor is arranged such that the signal emitted by each fibre passes through the system and is collected by a single photodiode that corresponds to that fibre.

Of course, further alternatives will be apparent to the person skilled in the art. For example, an alternative system might generate an inverse of the modulated pulses by collecting light rejected from the modulator. This could be directed onto a row of micro mirrors encoded with the inverse of the pattern used for the 'positively' encoded pulses. This allows the micro mirror array 412 to perform an XOR function. This could be achieved with apparatus arranged (conceptually) as in FIG. 3a of our previous application WO2008/075021 (which is incorporated herein by reference). The SLMs in that example carry out AND functions (which would be carried out by micro mirror arrays 412 in the present example) and the net effect of the two AND functions and the summing carried out at the detector is, in effect, an XOR function, since "A XOR B" is the same as "(A AND (not B)) OR ((not A) AND B)".

The micro mirror array 412 is set such that the mirrors represent sequences of patterns, where each row reflects the specific wavelengths (colour) emitted by a particular fibre and onward to its corresponding photodiode wavelength by wavelength according to which particular mirrors are set to retro-reflect.

Throughout the short duration of each pulse, the photodiode collects all the energy that has emanated from its corresponding fibre. This energy represents the sum of the energies encoded on an optical chirp 1707 by the modulator 1705 each of which represents a bit in the input sequence. For example, a "1" in a specific bit position in the input electrical signal allows that slice of the chirp to pass through the system as far as the corresponding column, or columns, of micro-mirrors. Each fibre could map to one or more columns on the micro mirror array 412. The comparatively long intervals between each narrow pulse may be used to facilitate the operation of subsequent processing stages, which need sufficient time to complete their operation.

In the embodiment described above, where each pulse lies only on one row or code pattern set on the micro mirror array 412, the system implements a set of "and" functions between each bit of the input signal and the corresponding bits in the numerous patterns represented by the settings of the micro-mirrors. Where the output of each chirp slice falls across more than one column of the micro mirror array 412 the sampling rate of the input signal is reduced. That way, because the samples in time have been replaced by spatial sampling, the sampling rate and sampling pattern may be controlled by choosing the number of micro-mirrors required to reflect a bit of information, i.e. it may be that a single colour is not always incident on a single mirror, but instead the number of mirrors can be selected according to the required number of bits in a sample. For the sake of example, the same micro mirror array comprising 1,024 rows could be used to sample a block of 256 bits long by controlling the mirrors in blocks of 4, and a block 1024 bits long could be sampled by controlling the mirrors individually.

The resultant outputs from these numerous optical logic functions, if integrated, form pulses at a suitably slow rate which have a power proportional to the logical result.

After the selected energy from each pulse has been collected in the photodiodes, it may be measured electrically by an Analogue to Digital Converter (ADC). This is known as an "integrate and dump" circuit. In this embodiment, the energy need only be collected once per block and this has the effect of reducing the clock rate of the system needed to process the information. Each ADC measures a different set of information in the input signal that is determined by a subset of the patterns on the micro mirror array 412.

As will be appreciated by the skilled person, electronic equivalents of optical circuits can usually be constructed. Such an example of electronic equivalents of the optical processor 100 described above can be described with reference to FIGS. 12-16

Figure 12:
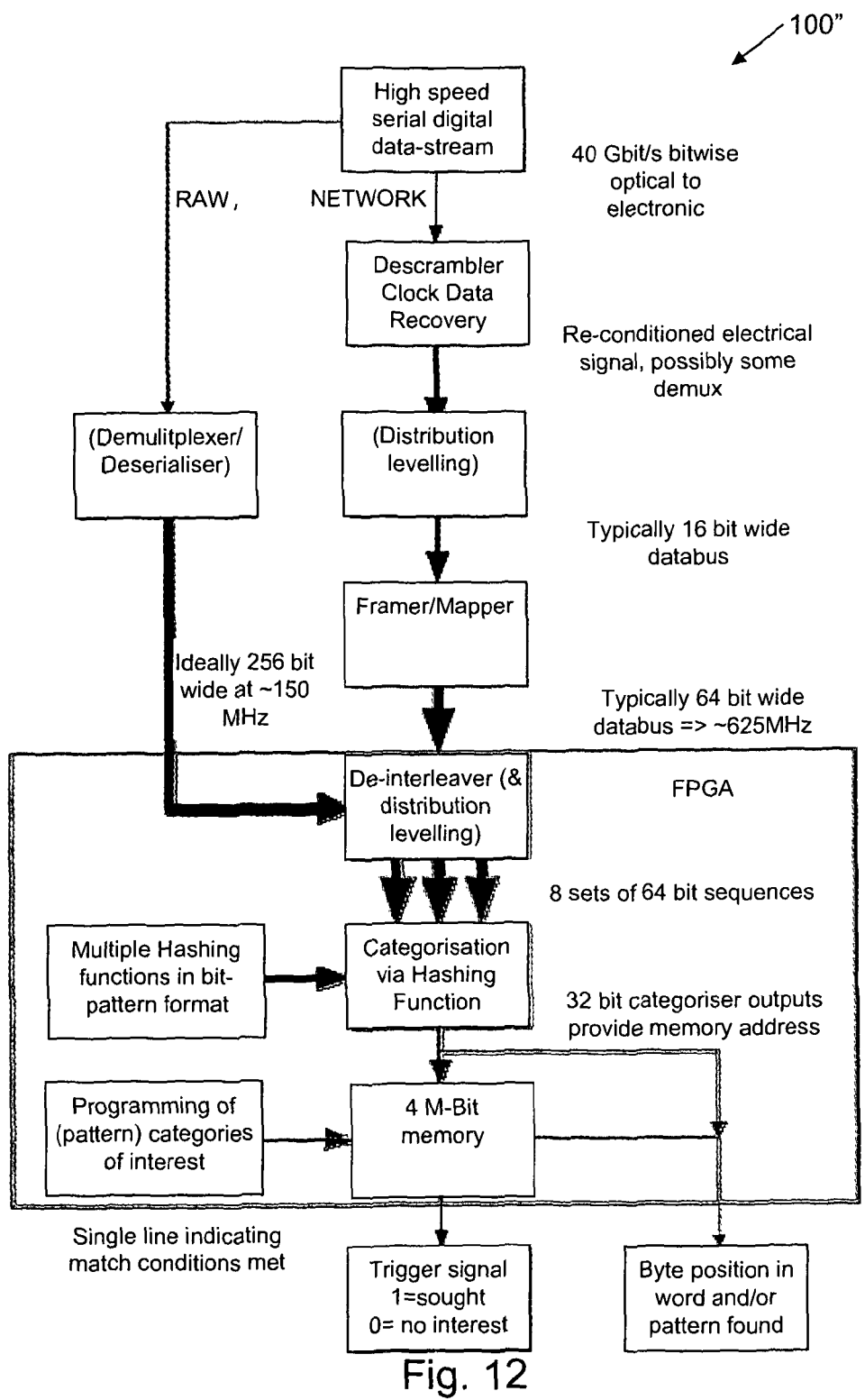
FIGS. 12 to 15 show an alternative embodiment of a processing apparatus.

FIG. 12 provides an overview of an electronic processor 100". Depending on the data format at the input, the input stream is converted to a parallel format via either a pure deserialiser (pure data) or network electronics to provide data in a format suitable for processing. In practical systems where the source of the data is known, only one of these means for converting the input to a parallel 'word' need be provided. However, as will be familiar to the skilled person, network data usually requires some 'pre-processing' in order to clean up the signal.

In this embodiment (and in order to bring the several GHz rate serial data to around 600 MHz which is compatible with Field Programmable Gate Arrays (FPGAs) available at the time of writing), a databus width of 64 or more is utilised. As will be appreciated by the skilled person, at the time of writing, FPGAs have of order 1000 digital inputs, and can thus readily accept this number of inputs. Therefore, the databus could be 128 bits wide, although this may be the practical limit in order to avoid filling up the input bandwidth.

Figure 13:
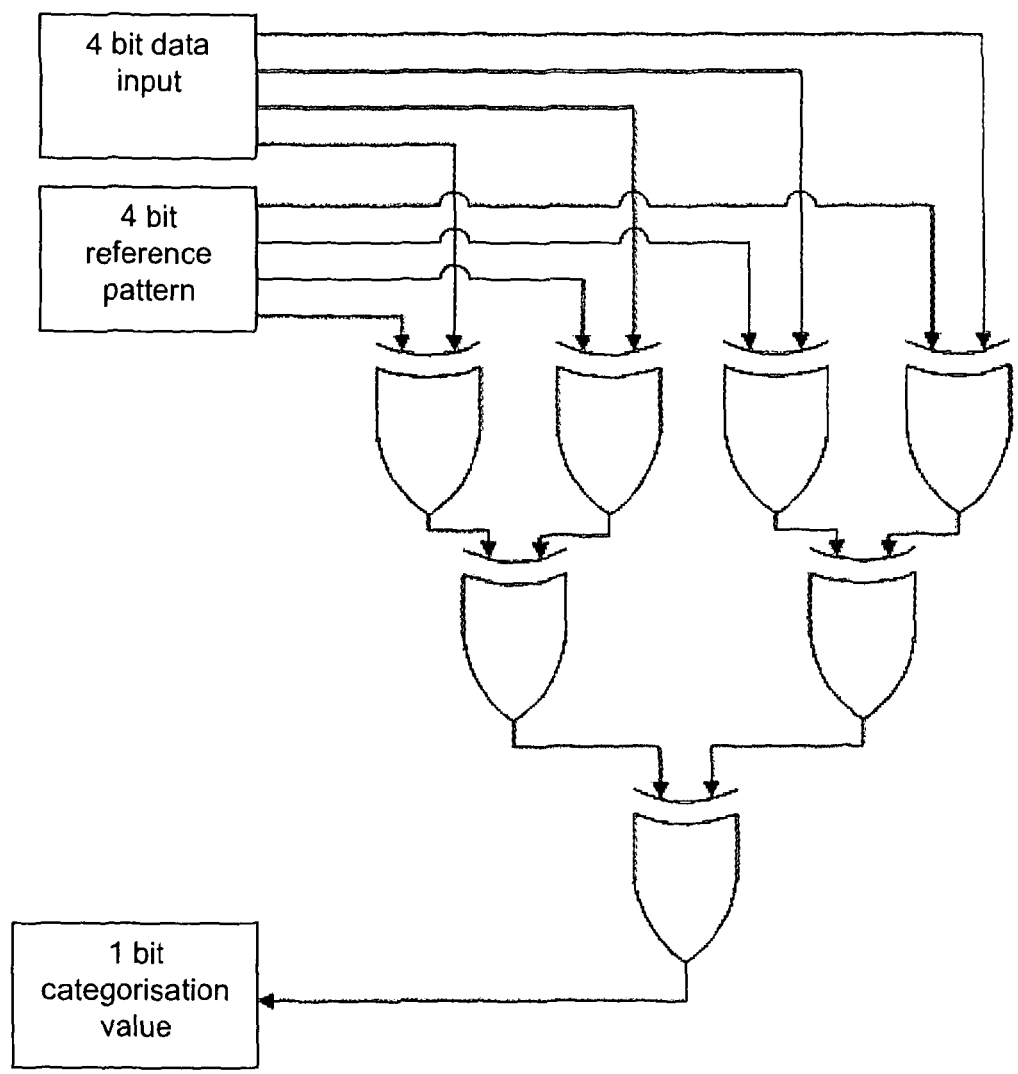

FIG. 13 shows an example of the programming of an 8 input Look Up Table (LUT) which allows it to be a building block for an XOR tree.

The input to the de-interleaver is a parallel "word", as described above. The de-interleaver is capable of carrying out entropy conditioning (which could instead be carried out on network data at the distribution levelling stage). The output from the de-interleaver is (in this embodiment) 8 sets of 64 bit sequences. This is passed to a categorisation module, which can for example be constructed as an XOR tree, as described earlier. Modern FPGAs contain a large number of Look-Up-Tables (LUTs) which can be configured as building blocks for such an XOR tree, as shown in FIG. 13. Cascading of a relatively small number of these LUT elements then allows construction of the required categoriser (Hashing Function), for example as which is shown in greater detail in FIG. 14.

Within the FPGA, a single clock cycle large bit width shift register allows generation of all 8 (in the case of 64 bit wide) possible byte boundaries where the 64 bit pattern may have started. Each of these is Hashed with 32 separate independent functions (as described above) to generate a 32-bit category address for each of the 8 possible start positions. The system clocks out a 1 whenever a "hit" is detected, and the channel on which it occurs defines the byte position within the (64-bit) word that it occurred. The actual address can also be used to indicate which pattern within the dictionary was detected.

Figure 14:
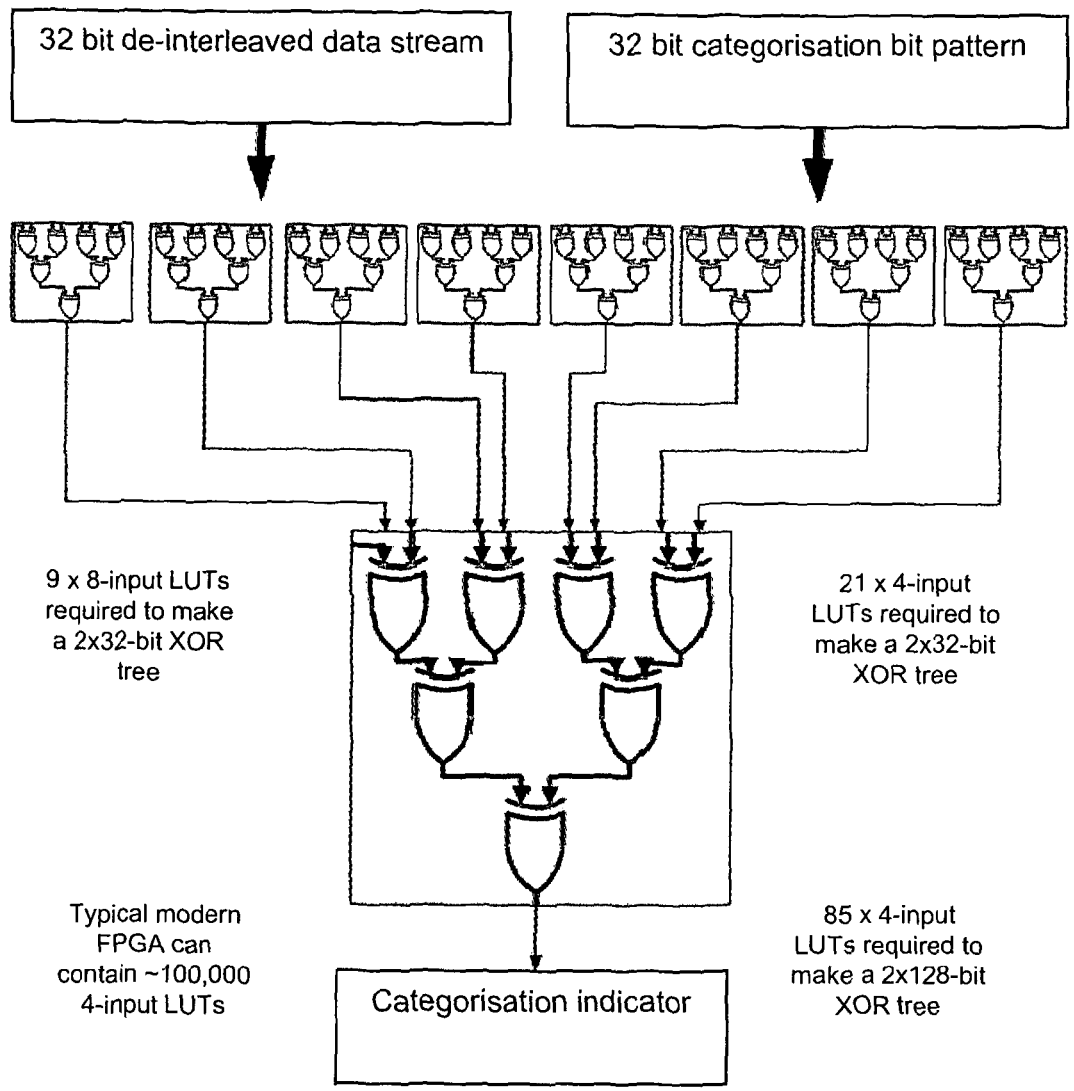

Typically, at the time of writing, FPGAs can contain over 100,000 Look-Up Table (LUT) elements which generally have 4, 6 or sometimes 8 inputs. These can be programmed to operate as small portions of an XOR tree structure, as shown above, which allows the generation of a categorising (Hashing) block. FIG. 14 shows a 2×32-bit block which can be generated from 9 8-input elements.

A 2×128 input XOR tree can be built from only 85 4-input LUT blocks, forming a categoriser (addressing) unit.

In some embodiments, more than one memory is provided (or a memory is partitioned). Taking the example of a partitioned memory, it may be that the dictionary is encoded into each of a series of partitions of the memory, each using a separate hash function to address each entry. In such embodiments, the multiple addresses (which can also be referred to as category IDs) could be generated from the bit stream (i.e. the architecture described above could be repeated multiple times), or further hashing could be used to generate multiple addresses from the generated. Such a system is now described.

In one example, the n-bit input stream output from the categoriser (or the optical equivalent) is added to a rolling register containing the hashes from m characters (where m is the search word length), i.e. a matrix of bits which is n×m in size. An XOR is applied along the words to give a final m-bit number which is the memory address to be set during setup or interrogated when running.

This design has advantages in that the XOR does not need to be applied across all the characters. Given the previous result, the next result can be found by an XOR with the previous character array (which is to be removed) and an XOR by the new array. There are two main disadvantages, however. First, the final hash address will be the same no matter which order the characters appear, i.e. anagrams will lead to the same hash value, and second if two characters are the same, the corresponding m-bit numbers will cancel, i.e. any word with the same singly appearing characters and the same number of paired (but possibly different) characters will produce the same hash value.

These collisions will lead to an imperfect hash which will not randomly fill the memory. Avoiding this anagram problem would be desirable.

Two possible solutions are now described.

In a first solution, a different hash is produced for each character position in the word. However, this would require more processing since the XOR process would need to be evaluated across the whole word for each new input.

Figure 18:
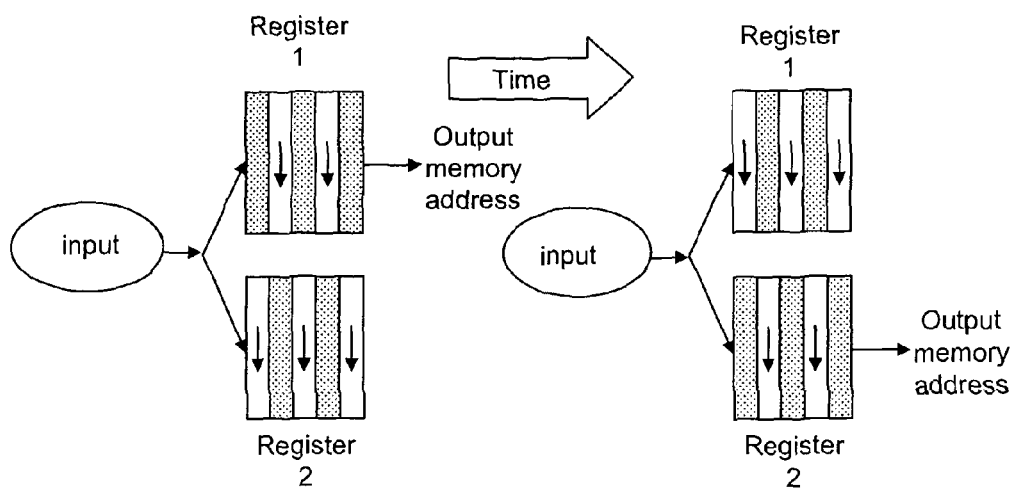
FIG. 18 shows an arrangement of data registers according to one embodiment of the invention.

A second option, as illustrated in FIG. 18 is to maintain multiple registers. Taking a simple example where the memory is partitioned into two sections, two registers are used to produce two hash values, one having the a first m-bit number as input, the other a looped bit shift of the m-bit number (i.e. the higher bits are shifted to the lower bit end and any bits that are lost are placed in the now empty higher bits). These are loaded alternately into the two registers, and the register with the first column not rotated used as the address of the memory. In this way the output hash that is used as the memory address is consistently defined. In fact, as described in greater detail below, two registers can be used to provide more than two hash functions.

This will lead to a reduction in the collisions that occur. Rather than complete anagrams producing the same hash, in this case the same hash will be produced if the letters in even positions are rearranged or the letters in the odd positions are rearranged. Also duplicate characters will only cancel if they are in positions of the same parity, i.e. odd or even positions. While this does not remove all of the collisions it does reduce them considerably.

The hashing scheme may be improved by noting that a large single memory may not be the most efficient format. If we have a number, w, of independent memories loaded by using w independent hash functions, then it is possible to use less memory while still reducing the false hit rate. Each of the memories will be queried in turn and, since all the memories must contain a 1 at the queried location, the probability of a hit is now $(c/b)^w$. The apparatus can be optimised by considering the following.

Assuming the total amount of memory is $x=wb$ and the required hit rate is $c/x$ it can be shown that:

$$c = x\left(\frac{c}{b}\right)^{x/b} \Rightarrow \ln\left(\frac{c}{x}\right) = \frac{x}{b}\ln\left(\frac{c}{b}\right) \Rightarrow -\frac{1}{x}\frac{dx}{db} = \frac{1}{b}\ln\left(\frac{c}{b}\right)\frac{dx}{db} - \frac{x}{b^2}\ln\left(\frac{c}{b}\right) - \frac{x}{b^2}$$

$$\therefore \left[\frac{1}{b}\ln\left(\frac{c}{b}\right) - \frac{1}{x}\right]\frac{dx}{db} = \frac{x}{b^2}\ln\left(\frac{c}{b}\right) + \frac{x}{b^2} = 0 \Rightarrow \ln\left(\frac{c}{b}\right) + 1 = 0$$

$$\therefore b = \exp(1)c$$

Thus, the optimal case is if each memory has exp(1) more elements than the number of search words. A simple example, to keep the numbers as multiples of 2, would be to require each memory to be four times as large as the number of search words. Further, if an even number of memories is used, then two registers described above in relation to FIG. 18 can be used and more hashes provided as required by using different shifts in the pairs of registers.

This scheme does not preclude the anagrams as described above since each pair of hashes will allow the same anagrams to pass the same hash values. The negative effects of this can be mitigated this by changing the period used in the rotations. In one example, four hashes are required (i.e. the memory is partitioned into 4). The first two can have alternating rotations as above. The other two could use three rotations before repeating. This requires three registers and two additional shifts (the first can be kept as the input, i.e. no bit shift) but leads to a repeat distance of 6 (the lowest common multiple of 2 and 3) characters in the word, i.e. the anagrams producing the same hash are now produced by interchanging characters six characters apart. It can be ensured that the repeat distance is larger than the search word length by using co-primed repeat distances in the various hashes. In this way, the collisions can be reduced considerably.

This scheme can be applied to any length of word. It can be shown that the same memories can be used to load these words of different lengths. The only requirement would be addition registers that interrogate the memory by producing the XOR series for the required number of characters. Assuming the hash remains independent the statistics described above still apply.

Two methods for checking for false positives are now described. In each case, the relevant portion of the input search string is required along with the hash memory address (es). In one scheme the memory address bytes are processed in parallel to lead to the relevant search word(s). One issue with this scheme is that there may be cases where two search words are represented by the same address and these will both need to be checked when this occurs; the requirement for a different number of checks would be more difficult to implement.

The second approach is to form a second hash table based on some information, for example 16 bits, from the hash memory address from which a position in the list of words (reordered so this new hash is increasing) is provided. The number from the next location in the hash table could also be used to specify where in the list the search can be stopped or, knowing that there will be a limited number of repeated search words for a given hash, a fixed number from the start location can be checked simultaneously.

The initial random hashing scheme used in the categoriser (or the optical equivalent, i.e. the patterns on the micro-mirror array) should spread the search words equally over the new hash table and it is also possible to interrogate how many search words are represented in each location when creating the table to be sure the best set of bits of the memory address have been used. Producing the hash table for different bits and comparing this to the random statistics gives an indication of how good the hashing scheme is for the case concerned. This could also be done off-line, for example when the memory locations to be loaded for the search words are being calculated.

By way of example, using two sets of shift registers, one with two cases with alternating bit shifts and another with five cases and bit shifts repeating after five periods, and taking the hash values of the first two of each set to provide addresses for four memory partitions, the false alarm rate is approximately reduced by the expected amount based on random statistics, even reductions of the order tens of thousands.

In a practical example, there maybe $2^{20}$ search words and a required false positive rate reduction of at least $2^{12}$. The optimised implementation in terms of providing multiple independent memories is to provide 6 memories each of $2^{22}$ bits (500 kB each with a total memory requirement of 3 MB). Each hash would provide a one in four hit reduction which is raised to the power of 6 leading to a false positive rate reduction of $4^6=2^{12}$ as required.

If, for example, the system is able to check 50 words in the time between hits then the false positive checking hash can be defined by taking 16 bits from the memory addressing hashes. This would give a hash table with $2^{16}$ buckets, each with, e.g. a 4 byte number (to represent the start location in the word list), a total of $2^{21}$ bits (250 kB). Each hash value would represent 16 words on average but checking could be limited to the 50 words starting at the location given by the hash table to keep the implementation simple or extract the number of words required and check each accordingly.

As noted above, hashing functions based on an XOR tree type construction as shown in FIG. 14 can produce a categorising bit from an input string and an equal length suitably random number.

The system can optionally be optimised by selecting suitable random numbers required to generate a number of independent category decisions (addresses). A method of performing such optimisation is now described.

For the sake of example, the category ID (or memory address) in this embodiment is created using a set of 32 hash functions which each generate a single bit from a nominally 128 bit pattern. The 32 1-bit values define the category ID or memory address.

An optimal hashing function should roughly slice the complete distribution in half. This means that each of the 32 hash functions preferably has ~50% probability of returning a 1. Further, any of the two hash functions should be independent so as to be providing a new insight into the nature or category of the pattern sought, i.e. the hash functions are desired to be uncorrelated. However, different types of data will have different characteristics. If, for example, the processor is being used to carry out pattern matching, the data received will have characteristics depending on whether it is image data or text data. Therefore, the ideal hash functions may not be known in advance and indeed may change in use of a processor as the data received changes its characteristics.

In the method now described, it is proposed to select a suitably large number of binary patterns to use as the "random numbers" in categorising the data, which will cover all possible variants of an identified bit pattern, thus automatically being certain to have a level distribution. These should be selected according to the data input but in practice, provided that the sample is sufficiently random, it is likely to produce a sufficiently good result (or, to put it another way, bad results will be rare). One example is the 56 possible sequences containing 3 ones and 5 zeros. Using this type of technique on each of, for example, 8 bytes in a pattern would then generate a large set of categorising bits which would need further "hashing down" to provide a suitable length binary identifier. This type of technique may generate an optimised categoriser for an assumed random input stream (it may be of less importance for a data-stream which has other features).

The proposal that follows potentially offers a more compact algorithm which, after a learning phase, can select a suitable but smaller set of "sufficiently and suitably random" numbers for use in a simple hashing algorithm.

In use of the apparatus in which data is expected to be input at a very high rate, e.g. 40 Gbps, within one second after switch-on, 5 billion bytes of data will have passed through the system, thus providing a potentially suitable dataset from which to determine characteristics in a learning phase. If after 1 millisecond, that first 5 million strings is characterised using a set of 32 separate functions which are completely random bit sequences (as the secondary or fixed inputs to the hashing functions), the frequency of hits on each bit can be analysed and any chosen random number whose hit rate is outside 50%+/- (for example) 10% can be replaced with a freshly selected random number. After a further millisecond or so, a further test and update can be performed to eventually determine a suitable selection of "random numbers". This learning and analysis process need not stop after a suitable set are selected, but could also be left to run continuously to track the statistical patterns in the data stream. This means that, if the characteristics of the input data stream change (e.g. the input stream changes from a representation of text to a representation of image date), the random number set may be updated to better suit the new data stream.

After this initial optimisation, a further stage which correlates the hits on each categorising bit with every other possible categorising bit can be used to confirm that each hashing function is unrelated (orthogonal, independent, uncorrelated) and thus providing "value".

A near-50% hit rate and a near-50% cross-correlation pattern is indicative of a suitable set of "random" numbers for the hashing functions.

After a short time the initial set of "random" numbers may be replaced with a more suitable set that offer a more even distribution. A further step to reduce the number of cross correlated (or anti-correlated) ID pairs is required to further optimise the set. After a short time, the false positive rate will decrease as the chosen set is better matched to the characteristics of the incoming data.

Although this optimises the search technique, it requires a capacity to update the bit pattern stored in the categoriser whenever a "random" number is replaced. This can be performed by appropriate use of shadow RAM, one side of which is programmed with the new data and enabled before disabling the other side. This may be necessary for any such system in order to allow an update of the dictionary without temporarily halting the search engine.

It is also possible that a combination of the large-but-perfect set of categoriser patterns with a self optimising hashing of these numbers down to the required level may offer a further optimised two stage solution.

A further optimisation that may be possible in an automatic mode is to encourage grouping of the sought after strings into fewer categories, as this will reduce the false alarm rate further.

Variable pattern lengths may have to be implemented by overlapping pairs of target strings and/or using sets of strings of length, for example, 32, 64, 128, 256.

Searching for a very large dictionary of shorter strings may cause a conflict where the gap between possible variants and category count leaves little room for a suitable data rate reduction and/or false positive rate.

As would be apparent to the skilled person, the optical equivalent of this is to re-write the mirror array 412 with patterns. However, as this requires physical repositioning of the mirrors it will not be as fast to implement as in the electronic system.

Figure 15:
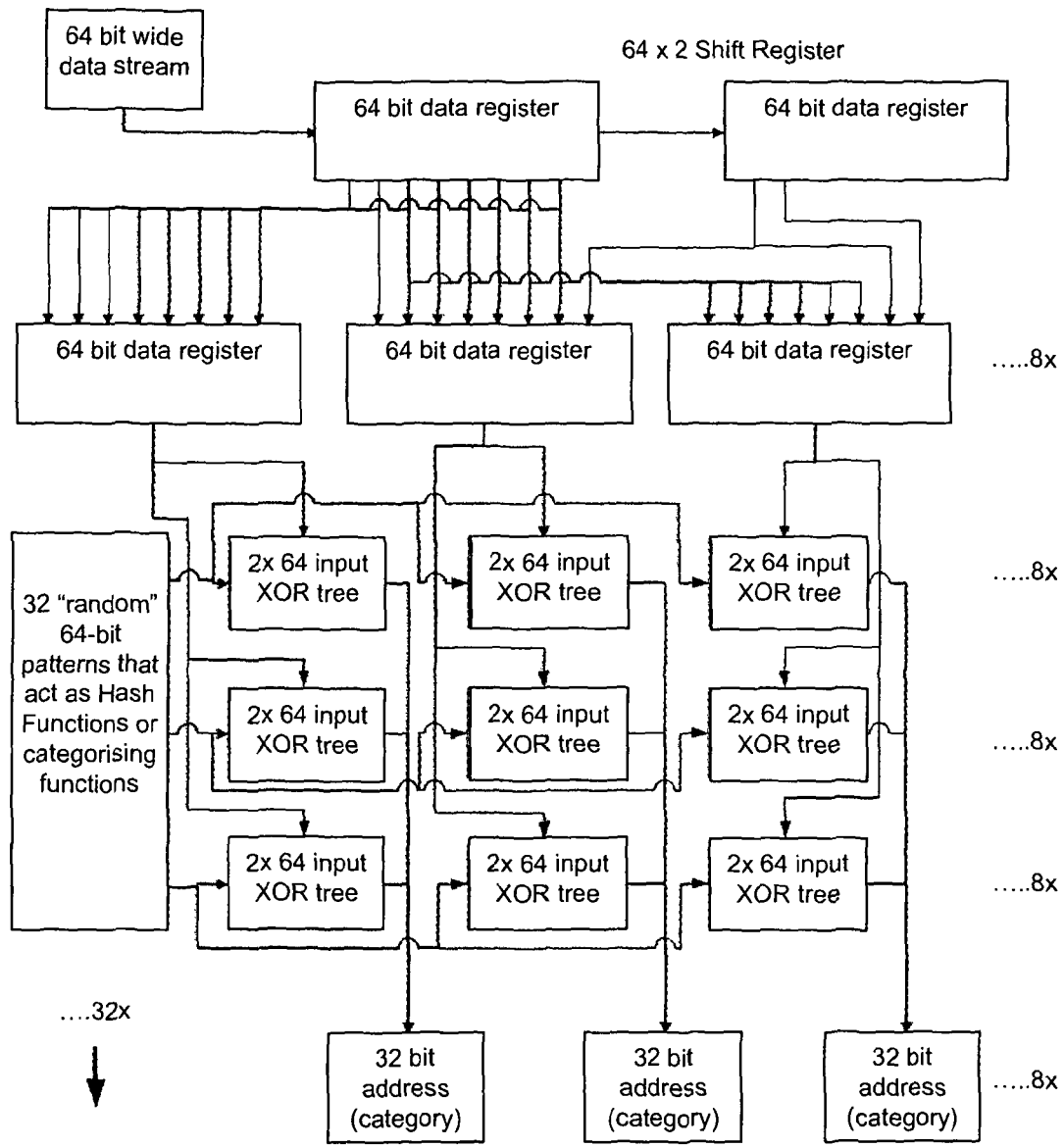

FIG. 15 shows how the shift register principle allows generation of byte boundary identified triggers.

A variant on the above embodiment which eases the process of detection of matches in a data stream, particularly if these are expected to be at high (e.g. telecoms) data rates above 10 GBit/s is now described. The variant now described is suitable for high speed operation, and large dictionary sizes by use of a multi-board system architecture, which also allows efficient operation, library-update-on-the-fly and the possibility of self learning designs.

As noted above, the size of the dictionary is very much smaller than the size of the memory available, or, looked at another way, the size of the memory available may place a practical limit on the size of the dictionary. In the apparatus now described in relation to an exemplary schematic layout shown in FIG. 16, FPGAs (in this example Xilinx Virtex 6 FPGAs) are 'daisy chained'. As will be familiar to the skilled person, the Xilinx Virtex 6 FPGAs has a set of up to 48 transceivers, known as GTX transceivers. Only a small subset of these transceivers is required. Other chips and connections which could be used will of course be familiar to the person skilled in the art. Eight transceivers or 'lines' are utilised in this example to test 64 bit words are being tested on the byte boundaries. As will be appreciated by the skilled person, these lines can only relay data at the line speed, which may be for example 5 GBit/s, so multiple lines may be required for high input data rates of, for example, 40 GBits/s As may be desirable in some embodiments, this arrangement allows the dictionary to be updated on-the-fly. While in the previously described embodiments, adding entries is relatively easy, as only a single bit needs setting in memory, this is more easily achieved if one spare processor is available in the chain to allow additions, and also allows a dictionary entry to be removed from the dictionary. Having a daisy chain layout in which at least one 'spare' processor is provided may therefore be advantageous.

Providing a 'spare' processor may also be advantageous in systems which employ self-learning algorithms, i.e. the ability to update dictionaries for example with words found in close contact with known dictionary terms. This processor can be removed from the chain and tasked instead with optimising the categorisation algorithm of its neighbour. Once this task has been successfully completed, the neighbour becomes the "spare" and optimises itself for its next neighbour's dictionary, and so on. This "round-robin" approach allows continuous uninterrupted operation and optimisation of the apparatus.

The use of multiple FPGAs allows multiple smaller hashes to be used for categorising. Instead of one 32-bit hash to generate the category ID (or memory address), then requiring bit-wise access to a single 32-bit memory, the same effect can be generated by 6 22-bit memories in parallel. Instead of providing a 4 Gbit of memory to achieve a 4096 data reduction for around 1 Million dictionary elements, this uses 6 sequential factors of 4, i.e. 4^6 which is also 4096. The advantage is that only 6 sets of 22-bit memory is required, i.e. 6×4 Mbit=24 Mbit, i.e. a reduction of 170×. This does however mean that 6 22 bit addresses are required so has a disadvantage in that, instead of 32 address lines, there is now a need for 6×22=132, i.e. ~4 times as many. The addresses could be generated by having multiple parallel processors or by operating on the output of one or more processor to produce further hashes (for example as described in relation to FIG. 18).

In one embodiment, by sequencing the 6 smaller hashes across 6 cascaded processors, the daisy-chained data can be "tagged" with a "1" from the first hash when a hit occurs, before handing on to the second. This would require a provision of a further transceiver (e.g. an extra GTX line) purely for this function, but would mean that each FPGA would only need 4 Mbit of memory per cascaded stage (×the number of copies running i.e. probably 64 Mbit for 16×) thus enabling the use of on-board FPGA bit-wise addressable memory.

In addition, to minimise power consumption, the hashes further down the cascaded sequence only need to be operational if their predecessors have agreed that the pattern could be a hit (i.e. if any of the FPGAs outputs a 0, downstream processing on the subsequent FPGAs in the daisy chain can stop). Further, it may be that the false alarm rate is sufficiently low without use of all of the FPGAs. This could be monitored automatically and one or more of the FPGA's taken out of the loop, possibly until and unless the false alarm rate exceeds a predetermined limit.

Figure 16:
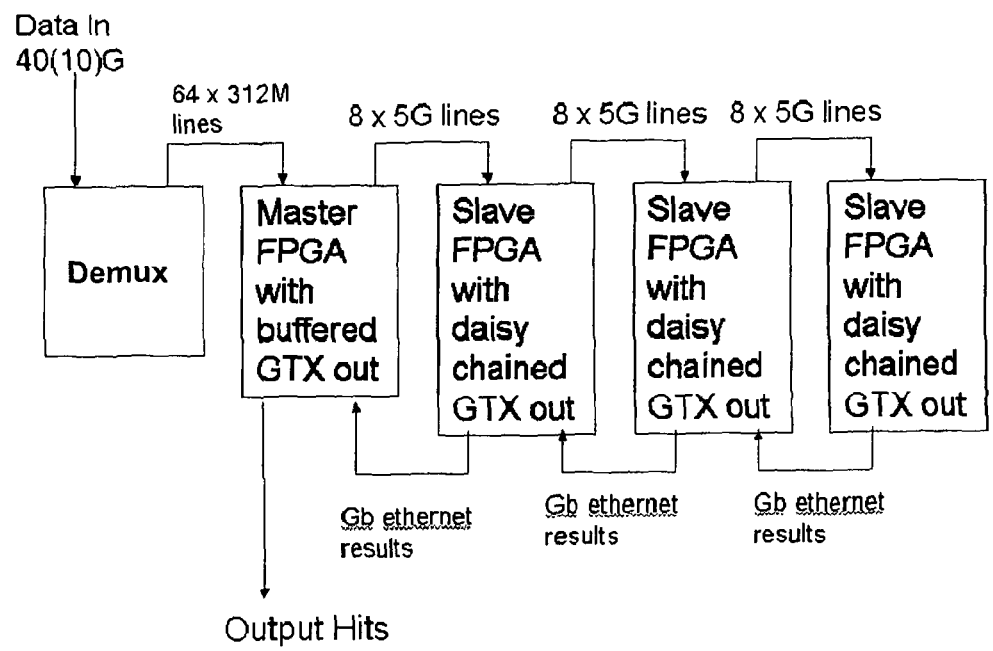
FIG. 16 shows an arrangement of FPGAs according to one embodiment of the invention

The daisy-chain architecture shown in FIG. 16 is shown by way of example, and there are other potential layouts. For example, a tree structure could be used if more transceivers (e.g. more the GTX transceivers of a Xilinx Virtex 6 FPGA) are used. This may have the advantage of reducing latency, but does require a more complicated cabling layout.

Various modifications to the examples described above could be made without departing from the scope of the invention.

For example, in some embodiments, the address space may be factorised, i.e. broken down into a number of groups of address lines that address separate RAM sub-blocks. If such embodiments include a k-way switch, there will be k blocks of m code spaces, each of which may be factorised according to the function of the machine. This would have the effect of examining features, represented as sets of correlations, present in the input signal, separately and each would be assigned to a separate specific set of RAM sub-blocks. If the input data stream represented a signal of a particular dimensionality, for example a raster scan, then locality of the n-bit samples could be achieved by inserting delays of multiples of the line rate in amongst (or replacing) the short delays.

As a further example, the machine may represent mathematical functions by mapping sets of input patterns (representing the function domain) to RAM sub blocks in such a way that the combined outputs of the blocks represents the co-domain of the function. Such mappings may not be, or need to be, exact. The above description of preferred embodiments is given by way of example only and modifications may be made by the person skilled in the art. Some examples of such modifications are described below.

In some configurations the signal to noise ratio of the laser pulses may deteriorate to the extent that the machine may not operate efficiently. In that case amplifiers (e.g. erbium doped fibre amplifiers (EDFAs)) may be inserted to remedy the problem. As this is well within the capability of the person skilled in the art, any such EDFAs are not shown in the accompanying Figures for the purpose of clarity.

The RAM 112 may be loaded with the required dictionary in at least two ways. It can learn the dictionary without knowledge of the processor (e.g. the entropy conditioner and the micro-mirror pattern) by 'showing' the processor examples of the patterns to be found—i.e. the dictionary terms are input in the same way as the input data stream. This would be advantageous, for example, if a number of similar patterns, for example in the form of images, appeared as a dictionary or subset thereof. In such a way, the system may be taught to generalise.

However, in alternative embodiments, with knowledge of the processing applied (e.g. the random number sequences written to the rows of micro mirrors or any other hashing function applied to the data) the contents of the RAM 112 may be managed remotely or locally.

In still further embodiments, a combination of the two techniques may be used. In such scenarios, there may be two or more independent "agents" supplying rules to the machine, each not knowing the others' dictionary. Each could not tell whether a false alarm in their space corresponded to a hit or a false alarm in another space. Even if it corresponded to another's dictionary, the word would remain unknown to a high degree of confidence. The rules applied by each agent may be different, e.g. one may be using the machine to apply mathematical functions, another looking for certain words, and another looking for image data, etc.

Therefore there are wider applications of the system than are encompassed by the term 'correlation' or 'pattern matching'.

The system may be made to generalise. For example, the system could comprise "wild cards" within the dictionary terms. In another embodiment, the system could be set up to detect all patterns within a given Hamming distance from the sought pattern. This will result in similar, rather than identical, patterns being found. Such techniques may include searching for portions of the dictionary terms.

Some possible applications for the processor have been discussed above. In particular, the uses of the apparatus 100 as a correlator have been discussed. However, there are other many other possible uses.

As mentioned above, the entropy conditioning unit 102 may not be present in all embodiments.

The terms 'processor' and 'processing apparatus' as used herein refer to any device with processing capability which can execute instructions. Such processing capabilities are incorporated into many different devices and therefore the term 'processor' includes PCs, servers, mobile telephones, personal digital assistants and many other devices. Moreover, the 'processor' or 'processing apparatus' described herein may be provide by one or more such devices, which need not form part of a single physical entity.

In summary, therefore, the processor, or processing apparatus, described herein may be provided by any computing-based device. Such a device may additionally comprise one or more inputs of any suitable type for receiving media content, Internet Protocol (IP) input, user instructions from a user input device, a communication interface (for example for accessing a database or any other data source), or the like. The computing-based device may additionally comprise one or more outputs.

The processor or processing apparatus may comprise microprocessors, controllers or any other suitable type of processors for processing computing executable instructions to control the operation of the apparatus. Computer executable instructions may be provided using any computer-readable media, such as memory. This memory may comprise random access memory (RAM), a disk storage device of any type such as a magnetic or optical storage device, a hard disk drive, or a CD, DVD or other disc drive. Flash memory, EPROM or EEPROM, or any other suitable memory may also be used.

The methods described herein may be performed by software in machine readable form on a storage medium, which may be suitable for execution on a parallel processor or a serial processor such that the method steps may be carried out in any suitable order, or simultaneously. It also includes software which defines the configuration of hardware, such as hardware description language software for configuring universal programmable chips.

Storage devices used to store program instructions may be distributed across a network and downloaded in whole or in part(s). Instructions may be executed on more than one processor or processing apparatus. All or part of the software instructions may be carried out by a dedicated circuit, such as a DSP, programmable logic array, or the like.

Reference to 'a' component may refer to one or more of those components.

The steps of the methods described herein may be carried out in any suitable order, or simultaneously as appropriate. Individual steps may be deleted from any of the methods described without departing from the invention.

The benefits and advantages described above may relate to one embodiment/aspect or may relate to several embodiments/aspects.

Any range or device value given herein may be extended or altered without losing the effect sought, as will be apparent to the skilled person from an understanding of the teachings herein. Further, aspects of any of the examples described above may be combined with aspects of any of the other examples described to form further examples without losing the effect sought.

SUMMARY OF NOTATION n=number of 1 bit samples taken from the input and parallelised into n different "colours"
m=number of micro-mirror patterns used
k=number of n bit samples (above) used to do one pattern search, and this may overlap between searches.
a=$\log_2$(possible input words)=length of pattern being searched for
b=$\log_2$(memory locations in each block)
c=the total number of different strings in the dictionary (i.e. search terms)

The invention claimed is:
1. Apparatus arranged to accept a serial input data stream, the apparatus comprising:
  (i) a sampler arranged to sample the input data stream to provide k samples thereof, wherein each of the samples is n bits long,
  (ii) a serial to parallel converter arranged to convert the serial input to a parallel signal;
  (iii) a string selector arranged to select m binary strings n bits long from at least a chosen subset of all random binary strings of a predetermined length,
  (iv) a logical operator arranged to perform a logical function for each of the k samples with each of the selected binary strings to provide a vector,
  (v) memory arranged to store a matrix of the vectors generated from k samples,

(vi) an address generator, arranged to generate RAM address segments from the matrix wherein the apparatus further comprises an entropy conditioning unit arranged to condition the input stream to ensure that the generated addresses are substantially distributed throughout available address space provided by the RAM.

2. Apparatus according to claim 1 which further comprises RAM, or a bank of at least two RAM portions.

3. Apparatus according to claim 1 which comprises at least one photonic component.

4. Apparatus according to claim 1 in which the sampler is arranged to take (i) a sample of the data starting with consecutive bits or (ii) a sample of the data every 8 bits.

5. Apparatus according to claim 1 which comprises a serial to parallel converter arranged to convert the input sample to a parallel signal.

6. Apparatus according to claim 1 in which the logical operator comprises a bitwise AND operator.

7. Apparatus according to claim 1 in which the string selector is arranged to be optimised following an analysis of at least one of the input data and the result of the data output by the logical operator.

8. Apparatus according to claim 1 which comprises one or more threshold detectors arranged to generate the vector.

9. Apparatus according to claim 1 in which the matrix is an m×k matrix and the address generator is arranged to generate RAM address segments by reading across a row of the m×k matrix.

10. Apparatus according to claim 1 which comprises a correlator.

11. A method of processing a serial input data stream, the method comprising the steps of:
  (i) converting the serial input into a parallel signal
  (ii) taking k samples of the converted serial input, wherein each sample is n bits long;
  (iii) for each of the k samples, selecting m binary strings, from at least a sub set of all random binary strings of a predetermined length wherein each of the selected m binary strings is different;
  (iv) for each of the k samples, performing a logical function with each of the m binary strings to generate a new binary string, resulting in a set of m new binary strings;
  (v) forming a vector from each of the m binary strings;
  (vi) forming a matrix out of the set of vectors; and
  (vi) generating segments of RAM addresses from the matrix wherein the input signal is conditioned with an entropy conditioning unit to ensure that the generated addresses are substantially distributed throughout available address space provided by the RAM.

12. A method according to claim 11 further comprising representing all bits of the input data stream.

13. A method according to claim 11 in which the k samples are taken (i) consecutively from the data stream or (ii) from the input data stream every 8 bits.

14. A method according to claim 11 in which the step of conditioning the entropy comprises processing the input data with a random number.

15. A method according to claim 14 in which the random number is looped such that each sample, or set of samples, is processed by the same random number.

16. A method according to claim 11 in which the selected binary strings are selected from a subset of the possible binary strings of length n, wherein the subset is defined by the number of ones in the string.

17. A method according to claim 16 in which the number of ones is less than or equal to $(n/2)-1$.

18. A method according to claim 11 in which the selected binary strings are selected from a subset of strings which have been identified following analysis of the input data.

19. A method according to claim 11 in which the selected binary strings are tested to determine if the selected binary strings produce unrelated new binary strings and further comprising selecting new binary strings if the selected new binary strings do not meet predetermined criteria.

20. A method according to claim 11 in which the step of forming a vector from the m binary strings comprises summing the ones contained in each m binary string produced by the logical function.

21. A method according to claim 20 which comprises using a threshold detector.

22. A method according to claim 11 in which the step of forming a vector from the m binary strings carrying out at least one hashing function.

23. A method according to claim 11 which further comprises checking the generated RAM address to determine if it contains an entry indicative of a pattern.

24. A method according to claim 11 which comprises initialising RAM by setting all of the contents to zero.

25. A method according to claim 24 which further comprises setting RAM content by inputting patterns of interest, processing the patterns to generate a RAM address and setting the corresponding locations to a "1".

26. A method according to claim 11 in which the logical function performed is a bitwise AND function.

* * * * *